US006185328B1

(12) United States Patent
Shiau

(10) Patent No.: US 6,185,328 B1
(45) Date of Patent: Feb. 6, 2001

(54) METHOD AND SYSTEM FOR CLASSIFYING AND PROCESSING OF PIXELS OF IMAGE DATA

(75) Inventor: Jeng-Nan Shiau, Webster, NY (US)

(73) Assignee: Xerox Corporation, Stamford, CT (US)

(*) Notice: Under 35 U.S.C. 154(b), the term of this patent shall be extended for 0 days.

(21) Appl. No.: 09/010,372

(22) Filed: Jan. 21, 1998

(51) Int. Cl.$^7$ ....................................... G06K 9/34
(52) U.S. Cl. ........................ 382/173; 382/299; 358/456
(58) Field of Search ............................. 382/173, 224, 382/199, 299; 358/455, 456, 457, 459, 462, 467

(56) References Cited

U.S. PATENT DOCUMENTS

| 5,343,309 | * | 8/1994 | Roetling | 358/455 |
| 5,361,142 | * | 11/1994 | Semasa | 358/455 |
| 5,696,842 | * | 12/1997 | Shirasawa et al. | 382/176 |
| 5,920,646 | * | 7/1999 | Kamon | 382/173 |
| 5,963,342 | * | 10/1999 | Hirabayashi | 358/456 |

* cited by examiner

*Primary Examiner*—Bhavesh Mehta
*Assistant Examiner*—Kanji Patel

(57) ABSTRACT

A system and method classify a pixel of image data as one of a plurality of image types. A first image characteristic value for the pixel, a second image characteristic value for the pixel, a third image characteristic value for the pixel, and a fourth image characteristic for the pixel is determined. Some of these determinations may be resolution dependent. The values from these determination are utilized in assigning an image type classification to the pixel. Moreover, if at least one of the image characteristic values is greater than a predetermined threshold value the pixel is classified as a halftone peak value. The system includes a plurality of microclassifiers for determining a distinct image characteristic value of the pixel; a plurality of macroreduction circuits connected to the plurality of microclassifiers for performing further higher level operations upon the distinct image characteristic values of the pixel to produce reduced values; and a classification circuit to classify the pixel as an image type based on the reduced values from the macroreduction circuits. The system also includes a circuit to detect flat peaks without detecting multiple peaks and a rectangular blur filtering system.

3 Claims, 15 Drawing Sheets

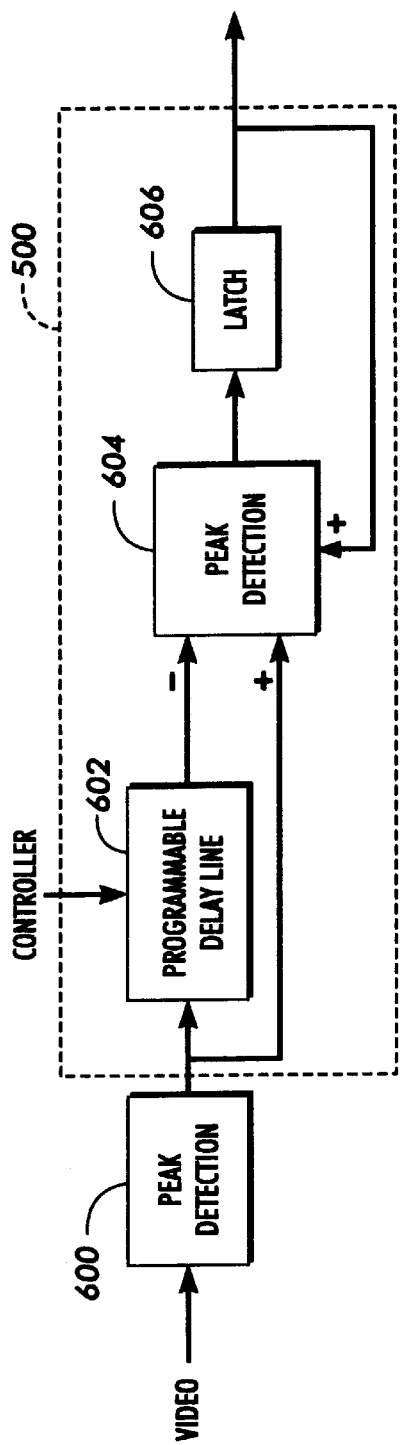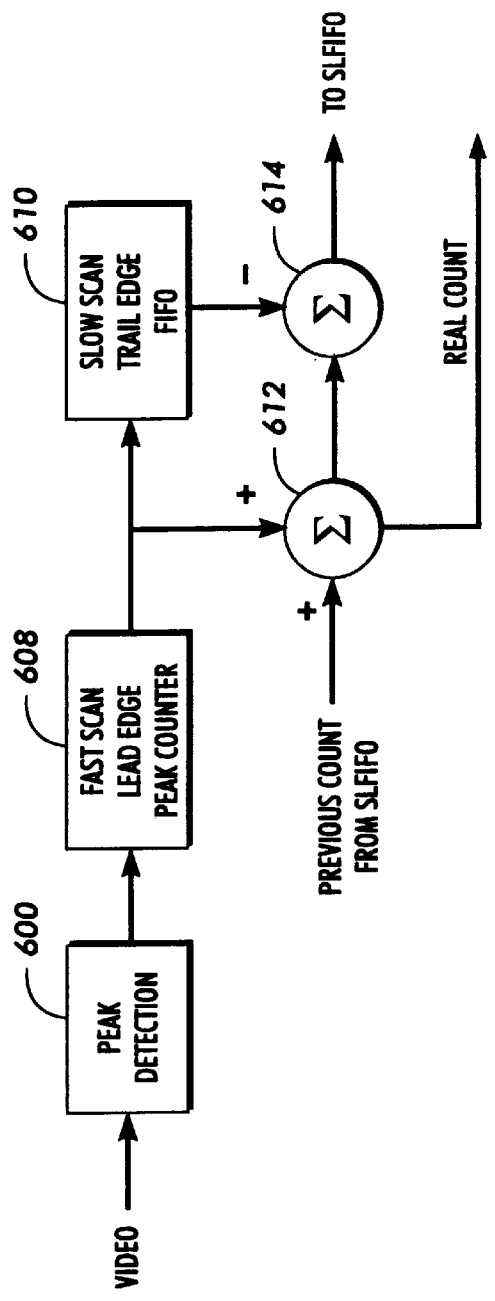
FIG. 23
FIG. 24

METHOD AND SYSTEM FOR CLASSIFYING AND PROCESSING OF PIXELS OF IMAGE DATA

FIELD OF THE PRESENT INVENTION

The present invention relates generally to a system for processing document images, and more particularly, to an improved method of image processing the document images utilizing a fuzzy logic classification process.

BACKGROUND OF THE PRESENT INVENTION

In the reproduction of images from an original document or images from video image data, and more particularly, to the rendering of image data representing an original document that has been electronically scanned, one is faced with limited reflectance domain resolution capabilities because most output devices are binary or require compression to binary for storage efficiency. This is particularly evident when attempting to reproduce halftones, lines, and continuous tone (contone) images.

An image data processing system may be tailored so as to offset the limited reflectance domain resolution capabilities of the rendering apparatus, but this tailoring is difficult due to the divergent processing needs required by different types of images which may be encountered by the rendering device. In this respect, it should be understood that the image content of the original document may consist of multiple image types, including halftones of various frequencies, continuous tones (contones), line copy, error diffused images, etc. or a combination of any of the above, and some unknown degree of some or all of the above or additional image types.

In view of the situation, optimizing the image processing system for one image type in an effort to offset the limitations in the resolution and the depth capability of the rendering apparatus may not be possible, requiring a compromised choice which may not produce acceptable results. Thus, for example, where one optimizes the system for low frequency halftones, it is often at the expense of degraded rendering of high frequency halftones, or of line copy, and visa versa.

To address this particular situation, "prior art" devices have utilized automatic image segmentation to serve as a tool to identify different image types or imagery. For example, in one such system, image segmentation was addressed by applying a function to the video, the output of which was used to instruct the image processing system as to the type of image data present so that it could be processed appropriately. In particular, an auto-correlation function was applied to the stream of pixel data to detect the existence and estimate the frequency of halftone image data. Such a method automatically processes a stream of image pixels representing unknown combinations of high and low frequency halftones, contones, and/or lines. The auto-correlation function was applied to the stream of image pixels, and for the portions of the stream that contain high frequency halftone image data, the function produced a large number of closely spaced peaks in the resultant signal.

In another auto-segmentation process, an auto-correlation function is calculated for the stream of halftone image data at selected time delays which are predicted to be indicative of the image frequency characteristics, without prior thresholding. Valleys in the resulting auto-correlated function are detected to determine whether a high frequency halftone image is present.

An example of a "prior art" automatic segmentation circuit is illustrated in FIG. 6. The basic system as shown in FIG. 6 is made up of three modules. Input information stored in a data buffer 10 is simultaneously directed to an image property classifying section 20, the first module, and an image processing section 30, the second module. The image property classifying section 20, is made up of any number of submodules, (e.g. auto-correlator 21 and discriminator 22), which determine whether a block of image pixels stored in the data buffer 10 is one type of imagery or another, (e.g. halftone, line/text, or contone). In parallel with the image property classifying section 20, the image processing section 30 is made up of any number of sub-processing sections, (e.g. high frequency halftone processor 31 low frequency halftone processor 32, line/text processor 33, or contone processor 34), which perform image processing operations on the same block of image pixels as section 20. Each image sub-processing section performs image processing operations that are adapted to improve the image quality of a distinct class of imagery. The third module, control section 41, uses the information derived from the image classifying section 20, to control the image processing section 30. In other words, the control section 41 acts like a multiplexer and selects the proper processed image data according to the image classification determined by the image classifying section 20.

The decision as to what class of imagery image data belongs to is typically binary in nature. For example, in a conventional image segmentation scheme image property classifying section 20 classifies image data as one of three classes of imagery, (high frequency halftone, low frequency halftone, or contone). Depending on those classification, image data is processed according to the properties of that class of imagery is selected, (either low pass filter and re-screening if it's a high frequency halftone, threshold with a random threshold if it is a low frequency halftone, etc.). Also, assuming that the decision as to which of the three classes of imagery image data belongs is based on a single image property, the peak count of the input image data, the resulting image classification decision of the peak count image property is made by thresholding the peak count into three classes of imagery.

Consequently, the control section 40 decides the type of image processing the image data requires depending on the decision made by the classification section 20. Thus, the output of classification section 20 is quantized to one of three possibilities. The control section 40 selects the output from one of the three image sub-processing sections based upon this classification.

Based on the nature of conventional image classification systems, the classifying information, gathered over a context of many pixels, changes gradually. But in the process of comparing this classifying information with a classification threshold one could create abrupt change in the classes. This abrupt decision making, which produces a forced choice among several distinct alternative choices, is a primary reason for the formation of visible artifacts in the resulting output image. Most transition points or thresholds are selected so that an image can be classified as one class of imagery with a high degree of certainty; however, those classes of imagery that cannot be classified with such certainty have multiple transition points or a transition zone.

Using only one point to define a transition zone results in the formation of visible artifacts in the resulting output image if the output image spans in the transition zone. Although it is possible to shift or make the transition zone narrower so that there is less chance that an image falls into the zone, there exists limitations on how narrow the zone can be made. The narrowing of the transition zone is the decreasing of noise and/or variation in the information used to classify so as to narrow the area over which classification is not "certain", resulting in less switching between classifications.

Moreover, the classification of real images covers a continuum from well below to well above thresholds between classifications. This means that there are areas of an image which are, for example, just above a threshold. Variations in the gathered (lowpass filtered) information due to "flaws" in the input video or ripple due to interactions between the area of image being used for the classification process and periodic structures in the input video results in areas falling below the threshold. With discrete classification, this results in a drastically different classification, thereby resulting in artifacts in the rendered image.

Thus, it is desirable to classify image data in a fuzzy manner, slowly sliding the classification from one classification to the other, reflecting the information that has been gathered. Artifacts in the resulting rendered image will now be soft and follow the contours of the image, and so the artifacts will not be objectionable.

In general, the "prior art" describes the control section 40 as essentially having a switch. Since the image processing steps performed for each class of imagery are different depending on the classification given to each block of input image pixels, the switch or multiplexer allows data residing at the output of the image processor 30 to be directed to an output buffer 50 depending on the decisions made by the imagery classifying section 20 which are received as signals on lines 23 and 24. This type of binary decision making is rigid and results in image segmentation decisions that do not fail gracefully and consequently form visible artifacts in the output image.

To address this forming of visible artifacts in the rendered output image, it has been proposed to utilize a probabilistic segmentation process to allow the image processing system to fail more gracefully when incorrect segmentation decisions are made. An example of such a probabilistic segmentation system is illustrated in FIG. 2.

FIG. 2 shows a block diagram of a conventional image processing system which incorporates a probabilistic classification system. As illustrated in FIG. 2, the conventional system receives input image data derived from any number of sources, including a raster input scanner, a graphics workstation, an electronic memory, or other storage elements, etc. In general, the image processing system shown in FIG. 2 includes probabilistic classifier 25, image processing section 30, an image processing and control mixer 41.

Input image data is made available to the image processing system along data bus 15, which is sequentially processed in parallel by probabilistic classifier 25 and image processing section 30. Probabilistic classifier 25 classifies the image data as a ratio of a number of predetermined classes of imagery. The ratio is defined by a set of probability values that predict the likelihood the image data is made up of a predetermined number of classes of imagery. The probabilities 27, one for each predetermined class of imagery, are input to the image processing mixer or control unit 41 along with image output data from image processing section 30.

Image processing section 30 includes units 31, 32, and 34 that generate output data from the image data in accordance with methods unique to each predetermined class of imagery. Subsequently, mixer 41 combines a percentage of each class of output image data from units 31, 32, and 34 according to the ratio of the probabilities 27 determined by classifier 25. The resulting output image data for mixer 41 is stored in output buffer 50 before subsequent transmission to an image output terminal such as a printer or display.

Initially, the stream of image pixels from an image input terminal (IIT) is fed to data buffer 10. The image data stored in buffer 10 is in raw grey format, for example, 6 to 8 bits per pixel. A suitable block size is 16 pixels at 400 spots per inch, or 12 pixels at 300 spots per inch. Too large of a sample size results in the inability to properly switch classification in narrow channels between fine structures in the image, or to switch soon enough when moving from one classification to another. An example of this problem is small text forming a title for a halftone image. Given a font size which is large enough to read, a good layout practice of leaving white space which is at least a half a line between the text and the image, a one millimeter block turns out to be a good compromise with most documents. Thus, too large a sample size results in classification transitions at the edge of objects to be larger than the whitespace between the objects, resulting in inappropriate classification and rendering.

With reference FIG. 3, the conventional probabilistic classifier 25 is shown in detail. The block of image pixels stored in buffer 10 is transmitted to a characteristic calculator 28 through data buffers 15. Calculator 28 provides an output value that characterizes a property of the image data transmitted from buffer 10, such as its peak count. In one embodiment, a characteristic value is determined by calculator 28 that represents the peak count of the block of image data. The peak count is determined by counting those pixels whose values are the non-trivial local area maximum or minimum in the block of image data. First local area maximum or minimum pixel values are selected depending on whether the average value of all the pixels in the block of image data is lower or higher than the median value of the number of levels of each pixel.

After calculator 28 evaluates the peak count of the image data, probability classifier 29 determines three probability values 27 that correspond to each image type associated with the peak count as expressed by the characteristic function stored in memory 26. The characteristic function, determined with apriori image data, represents a plurality of probability distributions that are determined using a population of images. Each probability distribution depicts the probability that a block of image data is a certain type given the occurrence of an image property, a peak count.

For example, the characteristic function stored in memory 26 can be represented by the graph shown in FIG. 4, which relates the probability distributions for a contone 1, low frequency halftone 2, and high frequency halftone 3 to the occurrence of a particular image characteristic, which in this example is a peak count. The characteristic function stored in memory 26 can be adjusted using input control 18. Using control 18, the resulting output image stored in buffer 50 can be altered by modifying the characteristic function representing the different classes of imagery evaluated by the image processing system 30.

Subsequently, probability classifier 29 determines each probability value by evaluating the probability distribution of each image type represented by the characteristic function stored in memory 26. After determining the probability values, classifier 29 outputs these results to image processing mixer or control 41.

The image processing section of FIG. 2 operates concurrently with the probabilistic classifier 25 on the image data stored in buffer 10. Image processing section 30 includes a high frequency halftone processing unit 31, a low frequency halftone processing unit 32, and a contone processing unit 34. Each processing unit processes all image data in accordance with a particular image type. Each of the processing units 31, 32, and 34 generates output blocks of unquantized video data.

Image processing control 41 mixes the data output blocks to form a composite block of output image signals that is stored in output buffer 50. The manner in which the output blocks are mixed is characterized by a ratio defined by the probability determined by the probabilistic classifier 25.

FIG. 5 shows the conventional image processing mixer 41 in detail. Mixer 41 multiplies the output blocks with the probability, using multipliers 42, 43, 44. The resulting output from each multiplier is representative of a percentage or ratio of each output block, the sum of which defines a composite block of output image signals. The composite block of output image signals is formed by adding the output of the multipliers using adder 45 and by subsequently quantizing the sum of adder 45 using quantizer 47. The resulting image block output by quantizer 47 is stored in output buffer 50 before subsequent transmission for output to an image output terminal having limited resolution or depth.

The above-described image classification system utilizes a probabilistic approach to classify the image data. Such an approach presents problems in that the classification of the image data is mutually exclusive, the image data is classified as a particular type in absolute terms eventhough the probability of the decision being correct is just over 50%. This results in difficulties in trying to design an image processing system which will process the image data without visible artifacts in the rendered image when the decision on the image type does not have a high confidence.

Not only is image classification important to a digital reprographic system, rendering based on this classification is important. One such component of the rendering system is digital filtering. The digital filtering process should be both efficient and low cost. Moreover, the filter design should have some non-separable and/or time-varying characteristics so that the filter can be used in a fuzzy segmentation system. However, trying to achieve one goal or another can adversely impact the other goal. Various approaches have been devised for the implementation of digital filtering techniques which try to solve minimize the adverse impacts. These techniques will be discussed briefly below.

In a "prior art" digital filtering technique, a two-dimensional finite impulse response filter having a plurality of filter portions of essentially identical construction are arranged in a parallel configuration. A demultiplexer separates an input data signal comprising consecutive digital words and supplies each digital word in sequence to a separate filter portion. Subsequently, a multiplexer, coupled to the output of the filter portions, selectively outputs the filtered data from each filter portion in a sequence corresponding to the order of separation of the input data, thereby resulting in a filtered version of the original input data.

The system described above all has the limitation with respect to either speed or high cost. In view of these limitations, it has been proposed to provide a plurality of one-dimensional transform units that may be selectively combined with an additional one-dimensional transform unit to produce a plurality of distinct two-dimensional filters, any one of which is selectable on a pixel by pixel basis. Moreover, this proposed conventional system has the added advantage of providing two-dimensional finite impulse response filters without employing multiple, identically constructed two-dimensional filters arranged in a parallel fashion, thereby substantially reducing the complexity and cost of the filter hardware. To get a better understanding of this conventional system, the conventional system will be described below.

The conventional system, as illustrated in FIG. 1, includes image processing module 20 which generally receives offset and gain corrected video through input line 22. Subsequently, the image processing module 20 processes the input video data according to control signals from CPU 24 to produce the output video signals on line 26. As illustrated in FIG. 1, the image processing module 20 may include an optional segmentation block 30 which has an associated line buffer 32, two-dimensional filters 34, and an one-dimensional rendering block 36. Also included in image processing module 20 is line buffer memory 38 for storing the context of incoming is scanlines.

Segmentation block 30, in conjunction with the associated scanline buffer 32, automatically determines those areas of the image which are representative of halftone input region. Output from the segmentation block, (video class), is used to implement subsequent image processing effects in accordance with a type or class of video signals identified by the segmentation block. For example, the segmentation block may identify a region containing data representative of an input high frequency halftone image, in which case a low-pass filter would be used to remove screen patterns, otherwise, a remaining text portion of the input video image may be processed with an edge enhancement filter to improve fine line and character reproduction when thresholded.

Two-dimensional filter block 34 is intended to process the incoming, corrected video in accordance with the predetermined filtering selection. Prior to establishment of the required scanline content, the input video bypasses the filter by using a bypass channel within the two-dimensional filter hardware. This bypass is necessary to avoid delirious effects to the video stream that may result from filtering of the input video prior to establishing the proper context.

Subsequent to two-dimensional filtering, the one-dimensional rendering block is used to alter the filtered, or possibly unfiltered, video data in accordance with selected one-dimensional video effects. One-dimensional video effects include, for example, thresholding, screening, inversion, tonal reproduction curve (TRC), pixel masking, one-dimensional scaling, and other effects which may be applied one-dimensionally to the steam of video signals. As in the two-dimensional filter, the one-dimensional rendering blocks also includes a bypass channel where no additional effects would be applied to the video, thereby enabling the received video to be passed through as an output video.

Therefore, it is desirable to implement an image classification system which provides a truer classification of the image type and the image types are not necessarily mutually exclusive. Such a system would incorporate fuzzy logic, thereby allowing image data to be classified as being a member of more than one image class. This feature is critical in areas where the image goes from one image type to another. Moreover, it is desirable to implement a image processing and rendering system which takes advantage of the fuzzy classification system.

SUMMARY OF THE PRESENT INVENTION

One aspect of the present invention is a method for reducing false halftone detection in image areas having thin lines. The method determines a horizontal video range value for a pixel in a video stream; determines a vertical video range value for a pixel in a video stream; determines a first diagonal video range value for a pixel in a video stream; determines a second diagonal video range value for a pixel in a video stream; determines if at least one value from the group of values consisting of horizontal video range value, vertical video range value, first diagonal video range value, and second diagonal video range value is greater than a predetermined threshold value; and classifies the pixel as a halftone peak value when at least one value from the group of values consisting of horizontal video range value, vertical video range value, first diagonal video range value, and second diagonal video range value is greater than a predetermined threshold value.

A second aspect of the present invention is a method for reducing false halftone detection in image areas having thin lines. The method determines a video range value for a pixel in a video stream; determines if the video range value is greater than a predetermined threshold value; and classifies the pixel as a halftone peak value when the video range value is greater than a predetermined threshold value.

A third aspect of the present invention is a method for reducing false halftone detection in image areas having thin lines. The method determines at least one video range value for a pixel in a video stream from a group of range values consisting of a horizontal video range value, a vertical video range value, a first diagonal video range value, and a second diagonal video range value; determines if at least one value from the group of values consisting of horizontal video range value, vertical video range value, first diagonal video range value, and second diagonal video range value is greater than a predetermined threshold value; and classifies the pixel as a halftone peak value when at least one value from the group of values consisting of horizontal video range value, vertical video range value, first diagonal video range value, and second diagonal video range value is greater than a predetermined threshold value.

Further objects and advantages of the present invention will become apparent from the following descriptions of the various features of the present invention.

BRIEF DESCRIPTION OF THE DRAWINGS

The following is a brief description of each drawing used in describing the present invention, thus, the drawings are being presented for illustrative purposes only and should not be limitative of the scope of the present invention, wherein:

FIG. 23 is a circuit diagram of a filter circuit according to the concepts of the present invention; and FIG. 24 is a block diagram illustrating an architecture for a two-dimensional blur filter.

DETAILED DESCRIPTION OF THE PRESENT INVENTION

Figure 1:
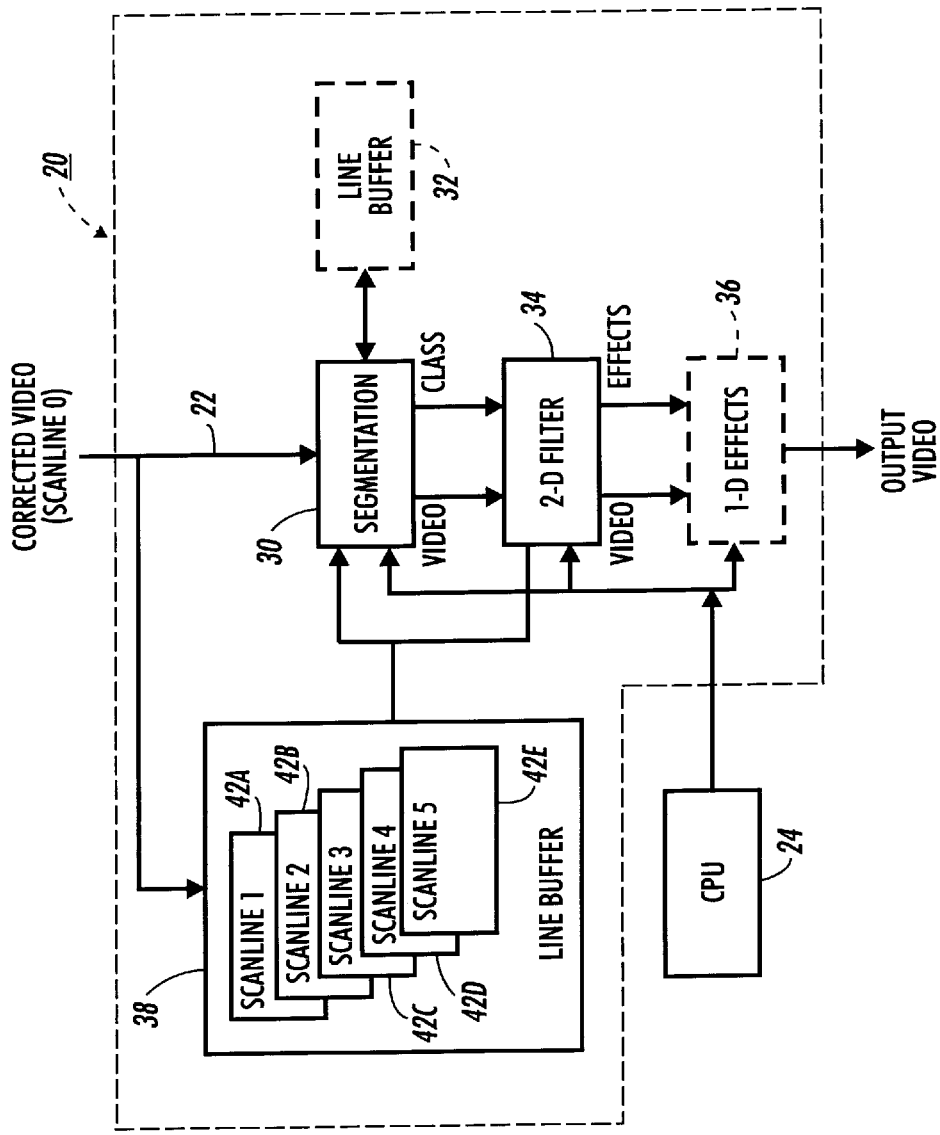
FIG. 1 is a schematic illustration of a conventional image processing hardware module incorporating a two-dimensional filter.
Figure 2:
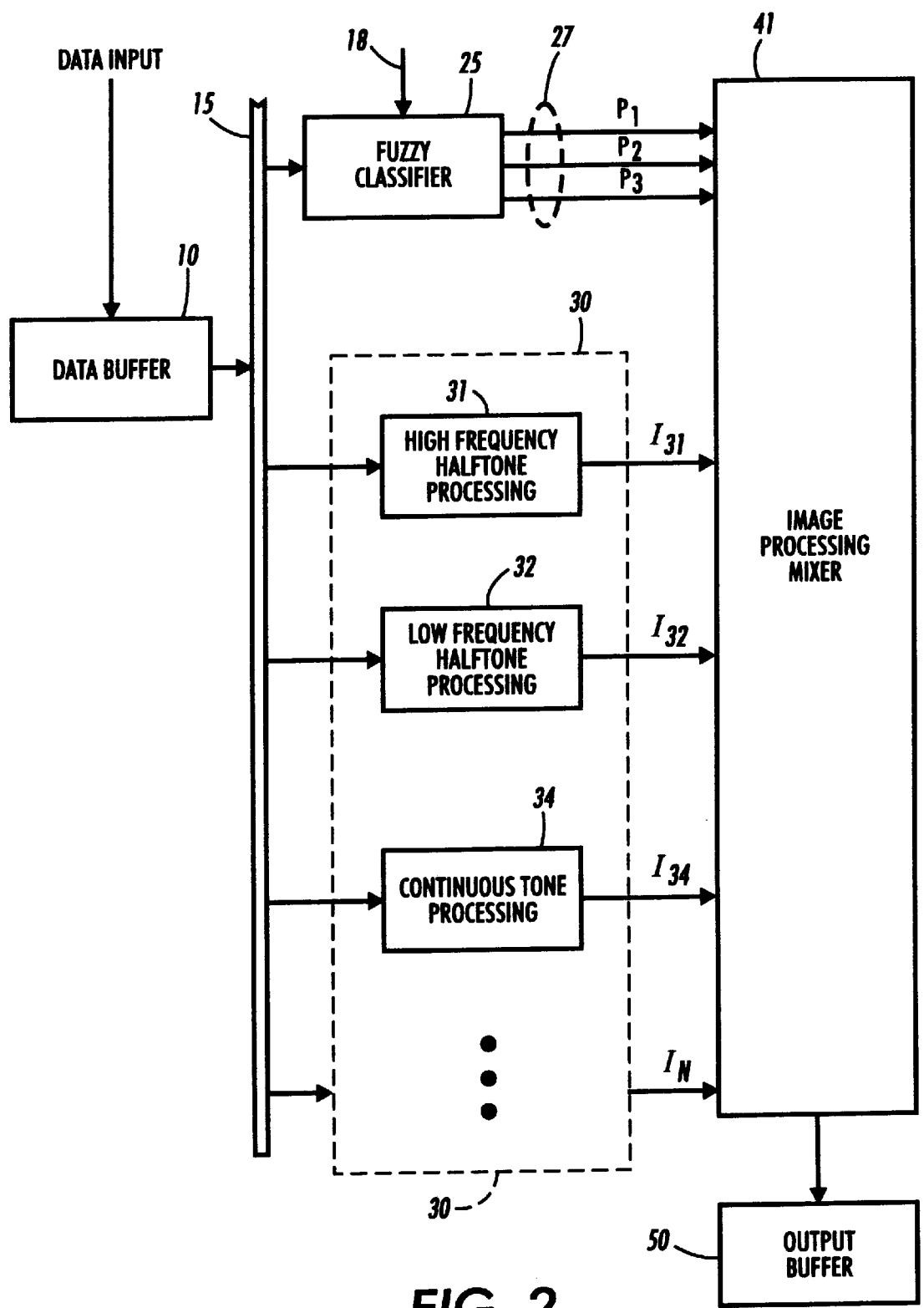
FIG. 2 is a block diagram illustrating a conventional image processing system incorporating probabilistic segmentation.
Figure 3:
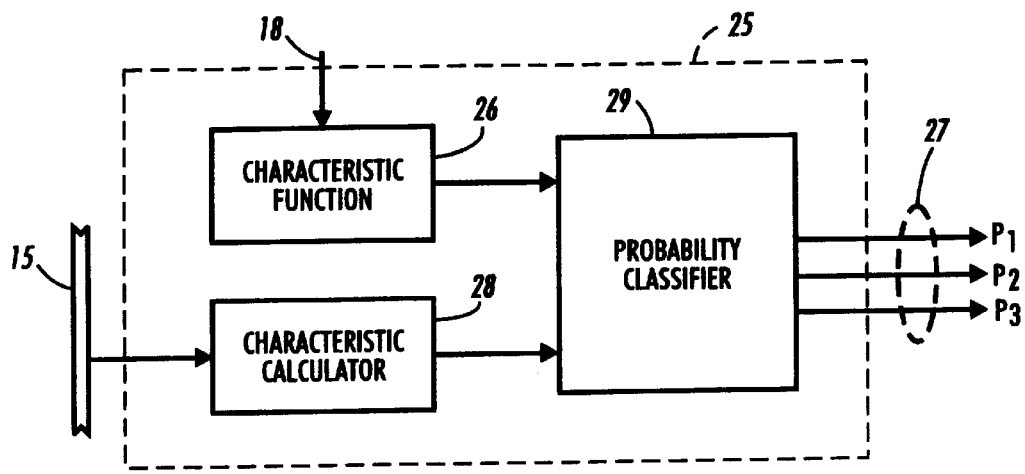
FIG. 3 is a block diagram detailing the probabilistic segmentor shown in FIG. 2.
Figure 4:
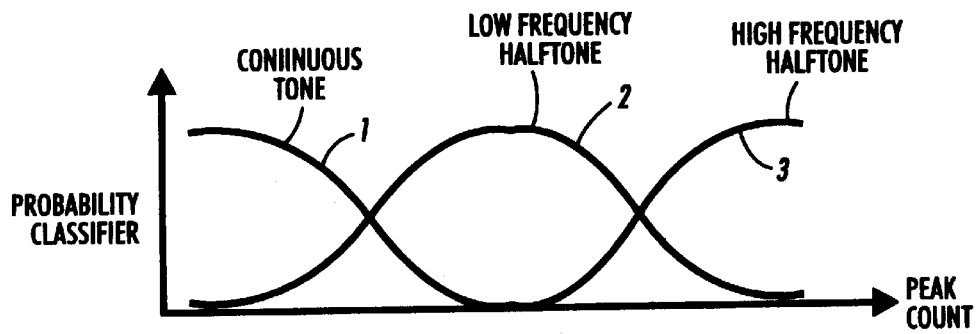
FIG. 4 shows an example of a characteristic function of the image property, peak count.
Figure 5:
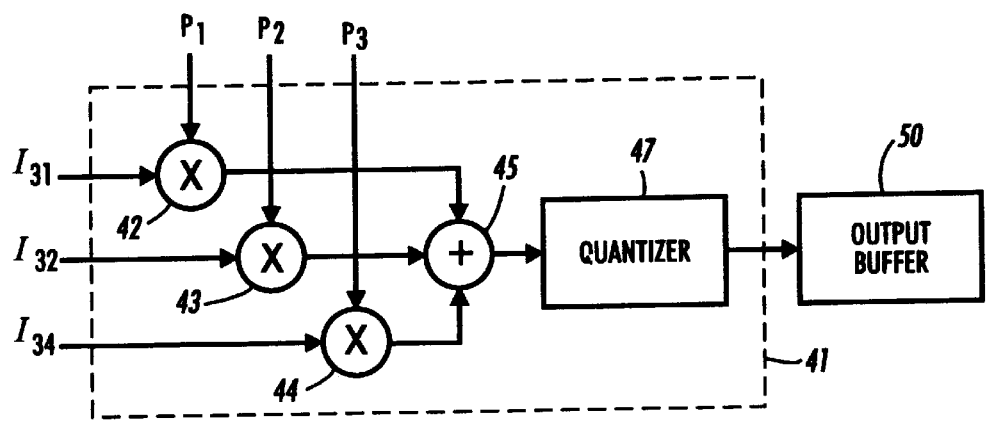
FIG. 5 is a block diagram illustrating in detail the image processing mixer shown in FIG. 2.
Figure 6:
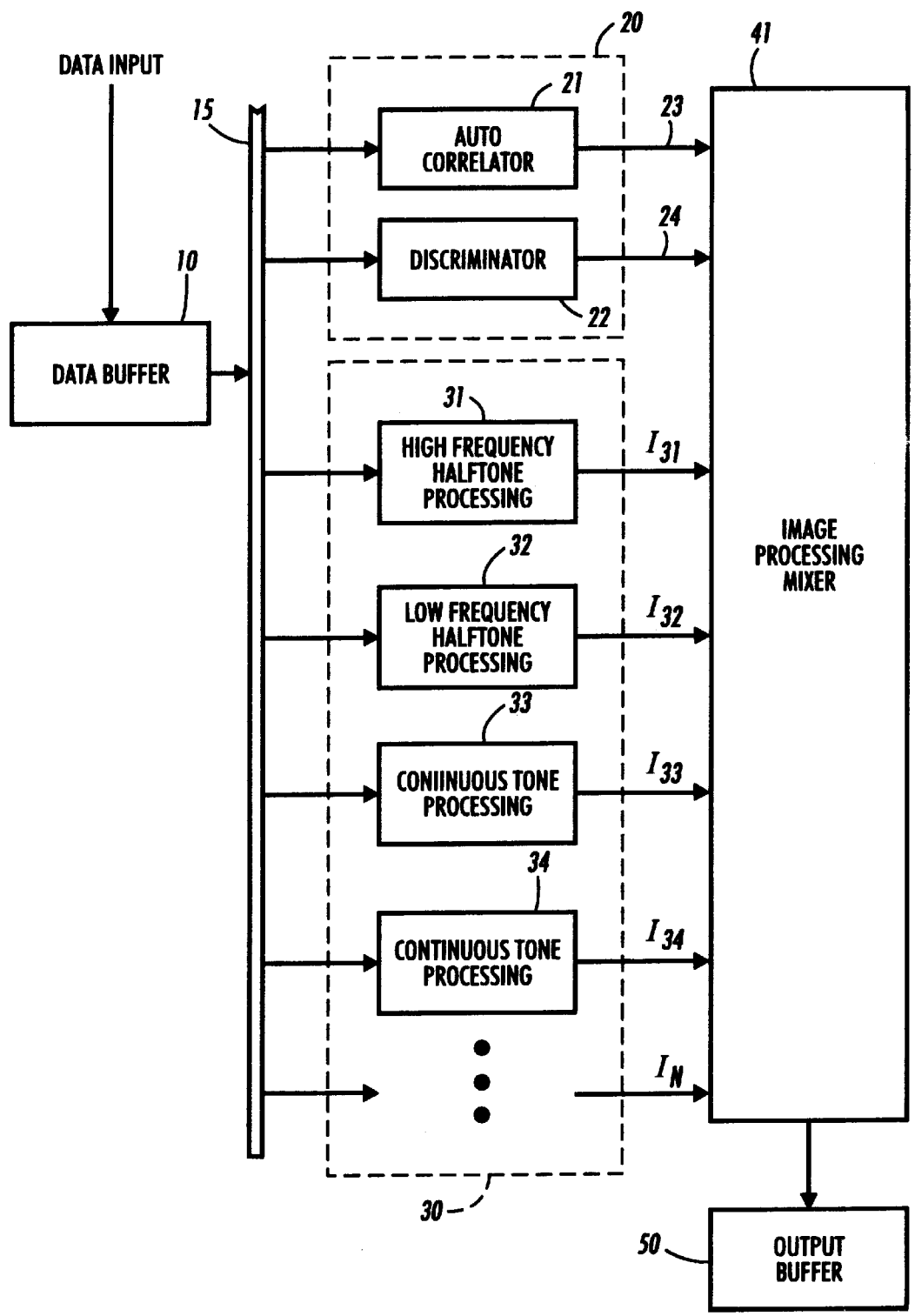
FIG. 6 is a block diagram illustrating a "prior art" image processing system.

The following will be a detailed description of the drawings illustrated in the present invention. In this description, the terms "image data" or "pixels" in the form of video image signals, which may be either analog or digital voltage representations of an image, indicate a representation of an image provided from a suitable source. For example, the image signals may be obtained through line by line scanning of an image bearing the original by one or more photosensitive elements, such as a multiple photosite array of charge couple devices commonly referred to as CCDs. Line by line scanning of an image bearing the original for the duration of image data is well known and does not form a part of the present invention.

Image data may also be derived by a computer workstation program in accordance with document creation application software or from a data storage device. In content, the original video image signals may be composed entirely of a single image component such as lines, text, low frequency halftones, high frequency halftones, contones, or any combination thereof.

The following description also includes references to slowscan and fastscan digital image data when discussing the directionality of two-dimensional filtering architecture. For purposes of clarification, fastscan data is intended to refer to individual pixels located in a succession along a raster of image information, while slowscan data refers to data derived from a common raster position across multiple rasters or scanlines.

As an example, slowscan data would be used to describe signals captured from a plurality of elements along a linear photosensitive array as array is moved relative to a document. On the other hand, fastscan data would refer to the sequential signals collected along the length of the linear photosensitive array during a single exposure period which is also commonly referred to as a raster of data.

Moreover, in describing the present invention, it is assumed that the video signal has a value in a range between 0 and 255. However, any range from the video signal can be utilized in conjunction with the present invention. Furthermore, in the following description, the term "grey level" will be used to describe both black and white and color applications.

Furthermore, in describing the present invention, the term "pixel" will be utilized. This term may refer to an electrical, (or optical, if fiber optics are used), signal which represents the physical measurable optical properties at a physical definable area on a receiving medium. The receiving medium can be any tangible document, photoreceptor, or marking material transfer medium.

Moreover, the term "pixel" may refer to an electrical, (or optical, if fiber optics are used), signal which represents the physically measurable optical properties at a physically definable area on the display medium. A plurality of the physically definable areas for both situations represent the physically measurable optical properties of an entire physical image to be rendered by either a material marking device, electrically or magnetic marking device, or optical display device.

Lastly, the term "pixel," in the scanning environment, may refer to an electrical, (or optical, if fiber optics are used), signal which represents physical optical property data generated from a signal photosensor cell when scanning a physical image so as to convert the physical optical properties of the physical image to an electronic or electrical representation. In other words, in this situation, a pixel is an electrical, (or optical), representation of the physical optical properties of a physical image measured at a physical definable area on a optical sensor. The term "pixel," in the rendering environment, may refer to an electrical, (or optical, if fiber optics are used), signal which represents the smallest physical area on a recording substrate that can be rendered. In other words, in this situation, a pixel is an electrical, (or optical), representation of the physical spot created by a laser in a laser printed or the physical spot created by the smallest rendered ink droplet.

Many of the documents produced today are compound documents in that the documents are composed of several different sub-images that are of different image types or image classes. Some of the common types are text, photos (contones), and halftones. One reason for the increased appearance of compound documents is the widespread use of commercially available word processing and desktop publishing software that is able to generate them.

As is well known, different types of images require different processing in order to provide optimal image quality. Conventionally, to automatically choose the best processing for different areas of an image, each area is classified into one of several pre-defined classes to determine how to render that part of the image. This image type or image class information can then be used to determine the appropriate processing required to obtain a good rendition of the image when printing, to choose a method of image compression, to determine if optical character recognition would be useful, etc.

However, as noted previously, the classification process should not be so crisp so as to avoid problems when the input image is not very similar to any of the classes, or the input images properties straddle the border between two classes.

For example, if a particular action is taken based upon a single class identification because the classes are mutually exclusive, it may create undesirable results for a non-prototype image. This is seen when rendering images for printing on a xerographic printer. The classification of the image can cause output artifacts such as when a halftone image is classified as a contone image.

Another type of problem is that adjacent areas of the image may be classified differently due to small variations in the image. This is called class switching. If this information is used for image enhancement and printing, the output may have objectionable artifacts due to local variations. Examples of these objectionable artifacts are grainy image outputs.

To eliminate the above described problems, an image classification system which utilizes a fuzzy membership into each category or class can be used. In other words, the classes in a fuzzy classification system are not mutually exclusive, thereby eliminating problems with class switching and also allowing those areas to have processing different than that of any of the other pre-defined classes; i.e., the output can choose between a continuum of possible image processing techniques.

In standard classification techniques, each area has one class assigned to it. In the fuzzy implementation of the present invention, each area has a classification vector assigned to it. Every element of the classification vector has a membership value associated with each of the pre-defined prototype classes.

Similar to the creation of crisp classifiers, a set of heuristic rules are used to determine the form of the classifier. The following is an example of how heuristic rules are used to create a fuzzy classifier, according to the concepts of the present invention.

For illustrative purposes, an example of a two class non-fuzzy system is discussed. In this example, the system only classifies a particular region as either contone (i.e., grey pictorial) or text. An image may be considered text if there are a lot of edges and most pixels are black or white. If this is not true, the picture is considered contone.

In order to determine edges, a variable relating to the Laplacian of the image data at every point (pixel) is used. A typical implementation for this type of segmentation may be if the summation of the squares of the Laplacian at every pixel in the subblock is greater than a predetermined summation threshold and the sum of the percentage of pixels with grey value less than a black threshold value and the percentage of pixels with grey value greater than a white threshold value is greater than a predetermined bi-modal threshold, the image is text, else the image is contone.

In this example, since the parameters are device dependent, tests, which are known to those skilled in the art, would be run to determine the values of all of the parameters; the percentage of pixels with grey value less than a black threshold value, the percentage of pixels with grey value greater than a white threshold value, the summation threshold, and the bi-modal threshold before executing the segmentation routine. Note that only one class can be chosen, either text or contone.

In order to implement a fuzzy classifier, according to the concepts of the present invention, several modifications must be made to the above described heuristic rules. As described above, there exists a single rule defining only text. If the condition for text is "not true," contone is chosen. In the fuzzy system of the present invention, contone must have it's own rule, since the text membership rule is not an absolute truth, but a relative truth that the classification is true.

Moreover, even providing a rule for contones will not satisfy the excluded middle law; therefore, a third "other" class must be added to satisfy the constraints of fuzzy logic. Without the "other" class, it would be possible to have membership of the image in all classes be very small. Thus, the "other" class creates a lower bound of a half (0.5) for the minimum membership in any given class. A minimum magnitude for the maximum membership assures that all actions/decisions made using the relative membership values are not extremely sensitive to the class memberships, which they would be if membership in all classes was small, thereby making the fuzzy classification more robust.

In the fuzzy classification scheme of the present invention, the pixel or unit of image data has a membership in each of the three classes; text, image and "other." In other words, the pixel is no longer considered to be an element of just one of the mutually exclusive classes. However, if the determination for one class reach absolute certainty; i.e. the membership in a single class is 1 and the other classes is zero; the fuzzy system does generate values which would represent a crisp system.

In view of this non-exclusivity characteristic of the pixel image membership, the membership of the pixel is represented by a membership vector, $V_i$, whose entries correspond to the membership of the pixel (image element) in each of the classes. Note, typically, there are no constraints on this vector other than all of it's elements must be greater than or equal to 0 and less than or equal to 1. However, since the fuzzy classification rules of the present invention have been setup with a third "other" class, at least one of the elements of the vector must be greater than or equal to 0.5 and less than or equal to 1.

Using the two class example above, the fuzzy classification rules would be the following. If the summation of the squares of the Laplacian at every pixel in the subblock is greater than a predetermined summation threshold and the sum of the percentage of pixels with grey value less than a black threshold value and the percentage of pixels with grey value greater than a white threshold value is greater than a predetermined bi-modal threshold, the pixel would be assigned a membership value for the "text" class which is the minimal value associated with each of the conditional statements.

To better understand this concept, the following brief explanation of fuzzy logic will be provided. In fuzzy logic, unlike Boolean logic, the results of the conditional statements do not generate either absolute true or absolute false, but a value corresponding to the amount of the resulting statement which is true. This result is due to the fact that the conditional statements are also not absolute.

For example, in the above described rule, from testing, it may be determined that the midpoint (predetermined target condition value) of the fuzzy Laplacian summation condition should be 50. The midpoint represents maximum uncertainty as to whether the value 50, in this example, is a member of the class Large Laplacian. Moreover, from testing, it is determined that, with absolute certainty, a pixel is member of the Large Laplacian (membership equals 1.0) if the summation is equal to or greater than 75 (predetermined absolute condition value) and it is determined that, with absolute certainty, a pixel is not a member of the Large Laplacian (membership equals 0.0) if the summation is equal to or less than 25 (predetermined absolute condition value). Fuzzy logic allows the classifier to assign 0.5 (conditional value) to a result where the summation is 50 and linearly extrapolate to the assigned values (conditional values) to 1 and 0.0 for the values 75 and 25, respectively; i.e., value 55 would be assigned a membership value of 0.6. Note that these values are device dependent, and thus, the midpoint and the range needs to be determined for each individual device.

Furthermore, from testing, it may be determined that the midpoint of the class bi-modal should be 80; with absolute certainty, a pixel is in the membership if the percentage sum is equal to or greater than 90; and, with absolute certainty, a pixel is not in the membership if the percentage sum is equal to or less than 70. Fuzzy logic allows the classifier to assign 0.5 to a result where the sum value is 80 and linearly extrapolate to the assigned values to 1 and 0.0 for the values 90 and 70, respectively; i.e., value 85 would be assigned a membership value of 0.75. Note that these values are device dependent, and thus, the midpoint and the range needs to be determined for each individual device.

To further explain the fuzzy technique, it is assumed that the membership values for each conditional statement are 0.5 and 0.33, respectively. In this scenario, the membership value for the pixel for the class text would be 0.33 because fuzzy logic treats "ANDed" statements as determining the minimal value for all the conditions and assigning the minimal value to the membership value.

Using the contone rule of if the summation of the squares of the Laplacian at every pixel in the subblock is less than a predetermined summation threshold and the sum of the percentage of pixels with grey value less than a black threshold value and the percentage of pixels with grey value greater than a white threshold value is less than a predetermined bi-modal threshold, the image is "contone," each conditional statement will be discussed in fuzzy logic terms.

For example, in the above described rule, from testing, it may be determined that the midpoint of the fuzzy Laplacian summation condition should be 50. Moreover, from testing, it is determined that, with absolute certainty, a pixel is in the membership if the summation is equal to or less than 25 and it is determined that, with absolute certainty, a pixel is not in the membership if the summation is equal to or greater than 75. Fuzzy logic allows the classifier to assign 0.5 to a result where the summation is 50 and linearly extrapolate to the assigned values to 1 and 0.0 for the values 25 and 75, respectively; i.e., value 55 would be assigned a membership value of 0.4.

Furthermore, from testing, it may be determined that the midpoint of the fuzzy bi-modal condition should be 80; with absolute certainty, a pixel is in the membership if the sum is equal to or less than 70; and, with absolute certainty, a pixel is not in the membership if the sum is equal to greater 90. Fuzzy logic allows the classifier to assign 0.5 to a result where the percentage value is 80 and linearly extrapolate to the assigned values to 1 and 0.0 for the values 70 and 90, respectively; i.e., value 85 would be assigned a membership value of 0.25.

To further explain the fuzzy technique, it is assumed that the membership values for each conditional statement are 0.75 and 0.8, respectively. In this scenario, the membership value for the pixel for the class text would be 0.75 because fuzzy logic treats "ANDed" statements as determining the minimal value for all the conditions and assigning the minimal value to the membership value.

Lastly, the fuzzy rules states that if image is neither "text" or "contone," the image is "other." This last rule, which defines the "other" class, can be represented mathematically as $\mu_{other}(image)=min(1-\mu_{text}(image), 1-\mu_{contone}(image))$ where $\mu_x(Y)$ is the membership of Y in the class X. Note that if $\mu_{text}(image)$, and $\mu_{contone}(image)$ are smaller than 0.5 then $\mu_{other}(image)$ will be greater than 0.5 (as stated earlier). In the example, given above, $\mu_{text}(image)$ is equal to 0.33 and $\mu_{contone}(image)$ is equal to 0.75, thus, $\mu_{other}(image)$ would be equal to 0.25, with the resulting membership vector being [0.33 0.75 0.25]. Note the element values of the vector need not add up to 1.

The predicate of each the rules described above is extended to a fuzzy truth instead of an absolute truth to provide the element value for the membership vector. Thus, in order to make the inequality "Y is >X" a fuzzy truth, a membership function is defined for ">X". Similarly, a fuzzy membership rule can be defined for <X (very often, the membership in (<X) is equal to not (>X): (1−membership of (>X)).

For simplicity in implementation, the membership in (>X) is defined as follows:

$$\mu_{>X}(Y) = \begin{cases} 1, & Y > X+\Delta X, \\ 0, & Y <= X - \Delta X, \\ (Y - X+\Delta X)/(2\Delta X), & X - \Delta X < Y <= X + \Delta X \end{cases}$$

The value of $\Delta X$ determines the level of fuzzification of the class; if $\Delta X$ is extremely small, then the definition reduces to the crisp definition of greater than. It is further noted that although the fuzzification has been described as a linear relationship, the function describing the values between the end points and the mid point may be any type of function. Moreover, the midpoint could represent absolute certainty in the class and have a membership value of 1 and the endpoints represent absolute certainty of non-membership such that the membership values would graphically form a triangle with the midpoint being the peak.

Returning to the multiple "If's" in the above rules, the membership of image in the class text is equal to the fuzzy value of the predicate, $\mu_{text}(image)=min(\mu_{>Slp\ Threshold}(Slp^2), \mu_{>Bimodal\ Threshold}(White+Black))$.

To expand the concepts of the present invention to the processing of images on a typical xerographic laser printer requires separating images into several classes; for example, white, black, edge, pictorial, low frequency halftone, mid frequency halftone, high frequency halftone and other, etc. The classes white, black, and pictorial are subclasses of the set "contone" and low frequency halftone, mid frequency halftone, high frequency halftone are subclasses of the set "halftone."

In a preferred embodiment of the present invention, the deterministic values for determining membership are as follows:

BLACK_%=the percentage of pixels with grey value less than a black threshold value;

WHITE_%=the percentage of pixels with grey value greater than a white threshold value;

Sij=Sum of the absolute values of the Laplacians in a window around the pixel being classified;

Range=Max grey Level−Min grey level inside a window around the pixel being classified; and Freq=Measurement of local 2-D frequency around the pixel being classified.

To determine the membership value in a particular class, these values are compared to a variety of predetermined thresholds in a similar manner as described above with respect to the three class system The various classes in this preferred embodiment are demonstrated by the following rules:

If (Sij is >SIJ_HALFTONE and RANGE is >RANGE_HALFTONE and FREQ is >FREQ_HALFTONE), then C1 is HALFTONE;

If (Sij is >SIJ_EDGE and RANGE is >RANGE_EDGE and FREQ is <FREQ_HALFTONE), then pixel is EDGE;

If (Sij is <SIJ_HALFTONE and FREQ is <FREQ_HALFTONE), then C1 is CONTONE;

If (C1 is CONTONE and BLACK_% is >BLACK_THRESHOLD), then pixel is BLACK;

If (C1 is CONTONE and WHITE_% is >WHITE_THRESHOLD), then pixel is WHITE;

If (C1 is CONTONE and BLACK_% is <BLACK_THRESHOLD and WHITE_% is >WHITE_THRESHOLD), then pixel is PICTORIAL;

If (C1 is HALFTONE and FREQ is <LOW_FREQ), then pixel is LOW_FREQ_HALFTONE;

If (C1 is HALFTONE and FREQ is >LOW_FREQ and FREQ is <HIGH_FREQ), then pixel IS MID_FREQ_HALFTONE; and If (C1 is HALFTONE and FREQ is >HIGH_FREQ), then pixel is HIGH_FREQ_HALFTONE; and If (pixel is not BLACK and pixel is not WHITE and pixel is not PICTORIAL and pixel is not EDGE and pixel is not LOW_FREQ_HALFTONE and pixel is NOT MID_FREQ_HALFTONE and pixel is not HIGH_FREQ_HALFTONE), then pixel is OTHER.

The predicate of each the rules described above is extended to a fuzzy truth instead of an absolute truth to provide the element value for the membership vector. Thus, in order to make the inequality "Y is >X" a fuzzy truth, a membership function is defined for ">X". Similarly, a fuzzy membership rule can be defined for <X (very often, the membership in (<X) is equal to not (>X): (1−membership of (>X)).

For simplicity in implementation, the membership in (>X) is again defined as follows:

$$\mu_{>X}(Y) = \begin{cases} 1, & Y > X+\Delta X, \\ 0, & Y <= X - \Delta X, \\ (Y - X+\Delta X)/(2\Delta X), & X - \Delta X < Y <= X + \Delta X \end{cases}$$

The value of $\Delta X$ determines the level of fuzzification of the class; if $\Delta X$ is extremely small, then the definition reduces to the crisp definition of greater than. It is further noted that although the fuzzification has been described as a linear relationship, the function describing the values between the end points and the mid point may be any type of function. Moreover, the midpoint could represent absolute certainty in the class and have a membership value of 1 and the endpoints represent absolute certainty of non-membership such that the membership values would graphically form a triangle with the midpoint being the peak. This type of class could be used for a membership function of the class "=X".

Returning to the multiple "If's" in the above rules, the membership value of image in the class "edge" would be equal to the fuzzy value of the predicate, $\mu_{edge}$(image)=min($\mu_{>Slp\ Threshold}(\Sigma lp)$, $\mu_{>Range\ Threshold}(Max_{grey}-Min_{grey})$, $\mu_{<Freq\ Threshold}$(2D Freq)); the membership value of image in the class "black" would be equal to the fuzzy value of the predicate, $\mu_{black}$(image)=min($\mu_{<Slp\ Threshold}(\Sigma lp)$, $\mu_{<Freq\ Threshold}$(2D Freq), $\mu_{>Black\ Threshold}$(% of black pixels)); the membership value of image in the class "white" would be equal to the fuzzy value of the predicate, $\mu_{white}$(image)=min($\mu_{<Slp\ Threshold}(\Sigma lp)$, $\mu_{<Freq\ Threshold}$(2D Freq), $\mu_{<White\ Threshold}$(% of white pixels)); the membership value of image in the class "pictorial" would be equal to the fuzzy value of the predicate, $\mu_{pictorial}$(image)=min($\mu_{<Slp\ Threshold}(\Sigma lp)$, $\mu_{<Freq\ Threshold}$(2D Freq), $\mu_{<Black\ Threshold}$(% of black pixels), $\mu_{<White\ Threshold}$(% of white pixels)); the membership value of image in the class "low frequency halftone" would be equal to the fuzzy value of the predicate, $\mu_{lowfreqhalf}$(image)=min($\mu_{>Slp\ Threshold}(\Sigma lp)$ $\mu_{>Range\ Threshold}(Max_{grey}-Min_{grey})$, $\mu_{>Freq\ Threshold}$(2D Freq), $\mu_{<LowFreq\ Threshold}$(2D Freq)); the membership value of image in the class "mid frequency halftone" would be equal to the fuzzy value of the predicate, $\mu_{midfreqhalf}$(image)=min($\mu_{>Slp\ Threshold}(\Sigma lp)$, $\mu_{>Range\ Threshold}(Max_{grey}-Min_{grey})$, $\mu_{>Freq\ Threshold}$(2D Freq), $\mu_{>LowFreq\ Threshold}$(2D Freq), $\mu_{<HighFreq\ Threshold}$(2D Freq)); and the membership value of image in the class "high frequency halftone" would be equal to the fuzzy value of the predicate, $\mu_{highfreqhalf}$(image)=min($\mu_{>Slp\ Threshold}(\Sigma lp)$, $\mu_{>Range\ Threshold}(Max_{grey}-Min_{grey})$, $\mu_{>Freq\ Threshold}$(2D Freq), $\mu_{>HighFreq\ Threshold}$(2D Freq)).

To implement the fuzzy segmentation process for the two image class situation, image data received from the image source is divided into blocks of pixels. The fuzzy image classifier then, to determine a membership value for a particular image type, calculates the summation of the squares of the Laplacians in a window around the pixel being classified. Moreover, the fuzzy classifier calculates the percentage of pixels that have a grey value less than a predetermined black value and determines the percentage of pixels within the block which have a grey value greater than a predetermined white value.

After calculating this information, the fuzzy classifier determines the conditional value for the condition relating to the summation of the squares of the Laplacian of every pixel in the block being greater than a Laplacian threshold and the conditional value for the condition relating to the sum of the percentage of pixels with a grey value greater than the predetermined black value and the percentage of the pixels with a grey value greater than the predetermined white value is greater than a bi-modal threshold value. Upon determining these two conditional values, the fuzzy classifier determines the minimal value and assigns this value as the membership value for the pixel in the "text" class.

The fuzzy classifier then determines the conditional value for the condition relating to the summation of the squares of the Laplacian of every pixel in the block is less than a Laplacian threshold value and the conditional value for the condition relating to the summation of the percentage of the pixels with a grey value less than a predetermined black value and the percentage of the pixels with a grey value greater than the predetermined white value is less the bi-modal threshold value. Upon determining these two conditional values, the fuzzy classifier determines the minimal value and assigns this value as the membership value for the pixel in the "contone" class.

The fuzzy classifier thereafter determines the membership value for the pixel in the "other" class by determining the minimal value between 1-the "text" membership value and 1-the "contone" membership value and assigns this value as the membership value for the pixel in the "other" class.

In this process, the pixels of image data received by the fuzzy classifier are assigned membership values for the three possible fuzzy classifications, "text," "contone," or "other." As noted above, the utilization of the "other" class is necessary in order to avoid having membership of the image in all classes to be very small.

An example of implementing fuzzy classification for a laser xerographic printer, will now be discussed, more specifically, a process, carried out by a fuzzy classifier, to assign membership values to the pixels of image data for eight possible types or classes.

As with the process described above, the process begins by dividing the pixels of image data into blocks of pixels. Thereafter, each block of pixels is analyzed to determine the sum of the absolute values of the Laplacians in a predetermined window around the pixel being presently analyzed; to determine a range value which is equal to the maximum grey level minus the minimum grey level inside the predetermined window around the pixel being presently analyzed; to determine a frequency value which is equal to the measurement of the local two-dimensional frequency around the pixel being presently analyzed; to determine a black value which is equal to the percentage of pixels that have a grey value less than a predetermined black value; and to determine a white value which is equal to the percentage of pixels within the window having a grey value greater than a predetermined white value.

Once these various values are determined, the fuzzy classifier begins the assigning of the membership values. The fuzzy classifier determines the conditional value for the condition relating to the sum of the absolute values of the Laplacian in the predetermined window around the pixel being presently analyzed being greater than a halftone threshold, the conditional value for the condition relating to the range value being greater than a range halftone threshold, and the conditional value for the condition relating to the frequency value being greater than a frequency halftone threshold. Upon determining these three conditional values, the fuzzy classifier determines the minimal value and assigns this value as the membership value for the pixel in the "halftone" class.

Then, the fuzzy classifier determines the conditional value for the condition relating to the summation of the absolute values of the Laplacians in the predetermined window around the pixel being presently analyzed being greater than an edge threshold, the conditional value for the condition relating to the range value being greater than a range edge threshold, and the conditional value for the condition relating to the frequency value being less than the frequency halftone threshold. Upon determining these three conditional values, the fuzzy classifier determines the minimal value and assigns this value as the membership value for the pixel in the "edge" class.

The fuzzy classifier thereafter determines the conditional value for the condition relating to the sum of the absolute values of the Laplacians in the predetermined window around the pixel being presently analyzed being less than the halftone threshold and the conditional value for the condition relating to the frequency value being less than the frequency halftone threshold. Upon determining these two conditional values, the fuzzy classifier determines the minimal value and assigns this value as the membership value for the pixel in the "contone" class.

The fuzzy classifier then determines the conditional value for the condition relating to the pixel being a contone image and the conditional value for the condition relating to the black value being greater than a black threshold value. Upon determining these two conditional values, the fuzzy classifier determines the minimal value and assigns this value as the membership value for the pixel in the "black" class.

Subsequently, the fuzzy classifier determines the conditional value for the condition relating to the pixel being a contone image and the conditional value for the condition relating to the white value being greater than the predetermined white threshold. Upon determining these two conditional values, the fuzzy classifier determines the minimal value and assigns this value as the membership value for the pixel in the "white" class.

The fuzzy classifier determines the conditional value for the condition relating to the pixel being a halftone image and the conditional value for the condition relating to the frequency value being less than a low frequency threshold value. Upon determining these two conditional values, the fuzzy classifier determines the minimal value and assigns this value as the membership value for the pixel in the "low frequency halftone" class. Thereafter, the fuzzy classifier determines the conditional value for the condition relating to the pixel being a halftone image, the conditional value for the condition relating to the frequency value being greater than the low frequency threshold value, and the conditional value for the condition relating to the frequency value being less than a high frequency threshold value. Upon determining these three conditional values, the fuzzy classifier determines the minimal value and assigns this value as the membership value for the pixel in the "mid frequency halftone" class.

The fuzzy classifier determines the conditional value for the condition relating to the pixel being a halftone image, the conditional value for the condition relating to the frequency value being greater than the high frequency threshold value. Upon determining these two conditional values, the fuzzy classifier determines the minimal value and assigns this value as the membership value for the pixel in the "high frequency halftone" class.

Lastly, the fuzzy classifier determines the membership value for the pixel in the "other" class by determining the minimal value between 1-the "edge" membership value, 1-the "black" membership value, 1-the "white" membership value, 1-the "pictorial" membership value, 1-the "low frequency halftone" membership value, 1-the "mid frequency halftone" membership value, and 1-the "high frequency halftone" membership value and assigns this value as the membership value for the pixel in the "other" class.

By utilizing these processes, the fuzzy image classifier can eliminate problems with class switching in areas between two or more pre-defined types. In other words, these processes implement a fuzzy classification scheme which allows the defining of various image types or classes to fail gracefully. Moreover, by implementing a fuzzy classification process, the fuzzy process allows the fuzzy memberships to have enhancement, different than any of the pre-defined classes. More specifically, the image processing system can choose between a continuum of possible processing operations to produce an output.

As noted above, fuzzy classification avoids sudden transitions in the classification domain, which results in minimizing abrupt transitions in density. A practical implementation of fuzzy classification is only step-wise continuous (not truly continuous due to the discreteness of the data being analyzed). Thus, if the fuzzy classification is over little rectangles, the slight residual transitions will still be visible and objectionable in the rendered output image. On the other hand, a pixel-by-pixel without fuzzy classification will not have any visible artifacts—but will be very noisy or grainy. The transitions will be on an individual pixel basis, but the transitions will be perceived as huge. Such transitions would be equivalent to injecting huge amounts of noise into the image.

However, as contemplated by the present invention, by combining fuzzy classification with a pixel-by-pixel classification implementation, the overall classification system can prevent rectangular artifacts (using pixel-by-pixel classification) in the rendered output image and reduce the classification switching noise (using fuzzy classification). In other words, the present invention utilizes a fuzzy classification process wherein this process is applied on a pixel-by-pixel basis and not on a window basis or globally.

In other words, a window implementation would make a classification based on the contents of the window and assigned all pixels within that window the same image type classification value or classification membership vector value, whereas a pixel-by-pixel implementation classifies each pixel individually based on the contexts surrounding the pixel or the image values in a neighborhood of this pixel. Although it is desirable for the pixel to be centered, it is not necessary. For example, the pixel being classified can be in the lower right of the context. In the pixel-by-pixel implementation the neighborhood moves along the fastscan direction one pixel at a time and along the slowscan direction one scanline at a time, while the window based implementation moves along the fastscan direction to the next adjoining non-overlapping window of pixels and moves along the slowscan direction to the next adjoining non-overlapping window of pixels.

Another practical advantage of a pixel-by-pixel basis is that the image can be classified and rendered in one pass. A windowed or global based approach requires the system to analyze the entire region (window or image) before making a classification decision. By then the video may be gone. The system either has to store it, then process it through the renderer beginning after the system has analyzed the entire region, or arrange for the image source to feed through the system twice. This increases system cost and may also slow down the system to ½ throughput. Pixel based requires only a small context since the context is limited and always in the neighborhood of the pixel being classified.

The present invention also allows the determination of output parameters such as filter coefficients and screening level given a fuzzy classification vector and a corresponding desired output for each prototype class. The present invention can also accommodate output types that must satisfy certain constraints (such as the mean gain of the filter) through the use of the "other" class. The fuzzy image processing greatly attenuates switching noise common in crisp decision image segmentation processes.

Processing image data for laser printer reproduction requires the implementation of two separate actions: image processing to enhance, through manipulation, which does not result in loss of information, such as filtering and TRC translation; and a lossy conversion of the resultant image to a representation accepted by a print engine, normally a reduction in the number of bits per pixel through either application of a screen or error diffusion. By utilizing a fuzzy classification scheme, the present invention can easily unify the processing implied by all of the partial memberships into a single processing action.

For example, each of the classes, defined using fuzzy classification, is provided with an ideal processing scheme.

This ideal image processing scheme would represent the image processing techniques used if the membership in that class was one (1.0) and all other classes had a membership of zero (0.0). The fuzzy image classification process, described above, provides the mechanism for determining the output for a given fuzzy membership because the output is a vector. Thus, fuzzy classification can be used to choose each element of the vector independently, thereby, as noted above, providing a continuum of possible image processing operations. However, this continuum is not directly conducive to determining screening operations and determining filter coefficients. More specifically, a screening operation, by its nature, is discrete; either a screen is applied or it isn't. At every point, a comparison is made between the image data (video level) and the screen value (screen level) to determine if a pixel is to be turned OFF or ON. Thus, on its face, screening would appear to be a poor candidate for fuzzy classification control because of its inability to be applied at differing levels.

The other problem arises with determining filter coefficients. Image processing requires that the filter coefficients sum to 1 (i.e., a constant grey level in produces the same grey level out). If there is the choice between several filters, their combination may no longer meet this requirement.

The present invention resolves the first situation, the problem with applying a screen in a fuzzy classification environment, by replacing the screening operation with a linear operation that provides the same effect. Instead of comparing all video to a pre-defined screen, a 2-D sinusoidal type function, with a maximum amplitude at 45 degrees, is added to the incoming video.

This screen, referred to as hybrid screening, creates video that is more likely to cluster output pixels in an error difflusion process. This clustering of video is the effect that is very pleasing to the human eye in constant or near constant grey areas. It is the clustering effect that makes this screened output superior to a straight non-screened error diffused output.

The frequency characteristics of the 2-D hybrid screen determines the approximate line pair per inch (lpi) dot pattern seen in the output; however, the ability to collect pixels into large dots, the desired effect in a screening process, is dependent on the screen's amplitude. This amplitude, a scalar, can be modified easily using the fuzzy image classification process of the present invention. All of the rules can assign a level (i.e., amplitude) of screening (large, medium, small or none, etc.). The size and frequency of the screen are predetermined to match the characteristics of the printer.

The image processing of an image using a fuzzy classification process is very similar to the fuzzy classification process itself. For example, in the screening case, the fuzzy image processing method would establish three screening classes (large, medium, and none) to determine the screen value to be applied to pixel. Each of these classes would have a set of rules as in the fuzzy classification method to determine the membership value for the pixel in the screening processing class. The membership value would then be used to calculate the actual screen amplitude which will be described in more detail below.

In a preferred embodiment of the present invention, the rules for the screening classes are as follows:

If (pixel is "edge" or pixel is "low frequency halftone" or pixel is "mid frequency halftone" or pixel is "other"), then screen is NO_SCREEN;

If (pixel is "black" or pixel is "white"), then screen is MEDIUM_SCREEN; or

If (pixel is "pictorial" or pixel is "high frequency halftone"), then screen is FULL_SCREEN.

Referring to the multiple "If's" in the above rules, the membership value of image in the class "NO_SCREEN" would be equal to the fuzzy value of the predicate, $\mu_{NO\_SCREEN}(\text{screen})=\max(\mu_{edge}(\text{pixel}), \mu_{lowfreqhalftone}(\text{pixel}), \mu_{midfreqhalftone}(\text{pixel}), \mu_{other}(\text{pixel}))$; the membership value of image in the class "MEDIUM_SCREEN" would be equal to the fuzzy value of the predicate, $\mu_{MEDIUM\_SCREEN}(\text{screen})=\max(\mu_{black}(\text{pixel}), \mu_{white}(\text{pixel}))$; and the membership value of image in the class "FULL_SCREEN" would be equal to the fuzzy value of the predicate, $\mu_{FULL\_SCREEN}(\text{screen})=\max(\mu_{pictorial}(\text{pixel}), \mu_{highfreqhalftone}(\text{pixel}))$.

To implement the fuzzy screening, the processing system determines the membership value of the pixel in each of the classes associated with a particular screening process and assigns the maximum value as the membership value in the screening class. For example, if the pixel had membership values for "edge," "low frequency halftone," "mid frequency halftone," and "other" of 0.6, 0.7, 0.2, and 0.3, respectively, the processing system would decode the membership vector and assign a membership value to the NO_SCREEN class of 0.7. Moreover, if the pixel had membership values for "black" and "white" of 0.6 and 0.5, respectively, the processing system would decode the membership vector and assign a membership value to the MEDIUM_SCREEN class of 0.6. Lastly, if the pixel had membership values for "pictorial" and "high frequency halftone" of 0.3 and 0.4, respectively, the processing system would decode the membership vector and assign a membership value to the FULL_SCREEN class of 0.4.

To determine the actual amplitude for the screen value, the fuzzy processing module, in the preferred embodiment of the present invention, multiply the membership value for each screen class with the ideal coefficient for that class and divide the product by the sum of the membership values. In the preferred embodiment, the NO_SCREEN coefficient is 0, MEDIUM_SCREEN coefficient is 0.5, and FULL_SCREEN coefficient is 1.0. Thus, in the example described above, the screen amplitude for the pixel being processed would be equal to a scalar value of 0.412 (((1.0*0.4)+(0.5*0.6)+(0.0*0.7))/(0.4+0.6+0.7)).

Figure 8:
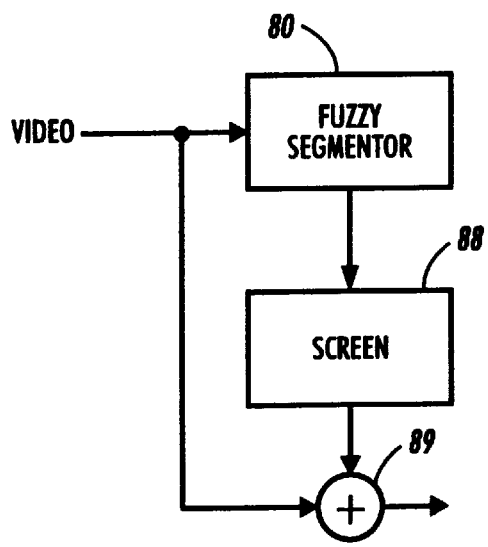
FIG. 8 is a block diagram illustrating a screening system incorporating the fuzzy classification process of the present invention.

An example of the application of fuzzy classification to screening is illustrated in FIG. 8. As illustrated in FIG. 8, the video signal or image data is fed into a fuzzy classifier 80 which classifies the image data according to the rules described above. The fuzzy image classifier 80 then generates a membership vector which is passed onto a screening generating circuit 88. The screen generating circuit 88 produces a screen value which is added to the image data at adder 89. The image data which is summed with the screen value corresponds to the same pixel as was classified by the fuzzy image classifier 80. In other words, the system illustrated in FIG. 8 also includes buffers (not shown) to insure that the pixel being processed corresponds to the correct membership vector being used to define the processing parameters.

Figure 9:
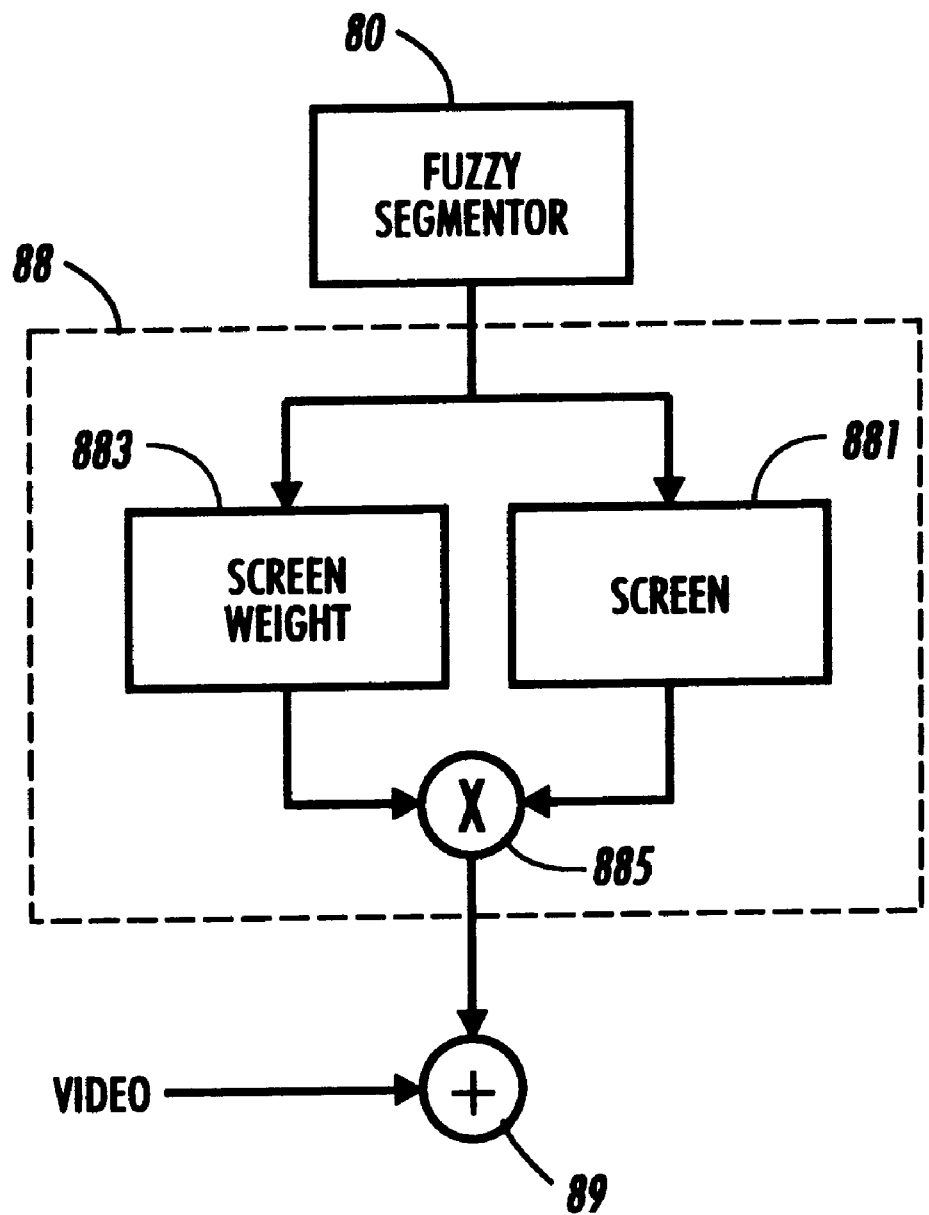
FIG. 9 is a block diagram illustrating a more detailed version of the system illustrated in FIG. 8.

A more detailed example of the application of fuzzy segmentation to screening is illustrated in FIG. 9. As illustrated in FIG. 9, the video signal or image data is fed into a fuzzy classifier 80 which classifies the image data according to the rules described above. The fuzzy image classifier 80 then generates a membership vector which is passed onto a screening generating circuit 88. The screen generating circuit 88 includes a screening weighting circuit 883, a screen value generating circuit 881, and a multiplier 885.

The screen weighting circuit 883 generates a weighting factor in response to the values in the membership vector so as to produce a no screen, a medium screen, or a high screen, or any screen therebetween, as discussed above. In other words, if the pixel had membership values for "edge," "low frequency halftone," "mid frequency halftone," and "other" of 0.8, 0.7, 0.1, and 0.3, respectively, the processing system would decode the membership vector and assign a membership value to the NO_SCREEN class of 0.8. Moreover, if the pixel had membership values for "black" and "white" of 0.4 and 0.1, respectively, the processing system would decode the membership vector and assign a membership value to the MEDIUM_SCREEN class of 0.4. Lastly, if the pixel had membership values for "pictorial" and "high frequency halftone" of 0.2 and 0.0, respectively, the processing system would decode the membership vector and assign a membership value to the FULL_SCREEN class of 0.2.

Thus, in this example, the screen amplitude for the pixel being processed would be equal to a scalar value of 0.286 (((1.0*0.2)+(0.5*0.4)+(0.0*0.8))/(0.2+0.4+0.8)).

The screen value generating circuit 881, which may be a lookup table or a hardwired circuit, produces a screen value based on the position of the pixel (image data) within the image. The weighting factor from the screen weighting circuit 883 and the screen value from screen value generating circuit 881 are multiplied together by multiplier 885 to produce the screen value to be added to the pixel. This screen value is added to the image data at adder 89.

The image data which is summed with the screen value corresponds to the same pixel as was classified by the fuzzy image classifier 80. In other words, the system illustrated in FIG. 9 also includes buffers (not shown) to insure that the pixel being processed corresponds to the correct membership vector being used to define the processing parameters.

As noted above, the problem of using a fuzzy image classification system to control digital filtering is two-fold. First, digital filtering is not a scalar function, but a matrix function. Secondly, there is a constraint on the matrix function; the filter must have gain of 1.0 at $(\omega_1\omega_2)=(0,0)$. This ensures that constant grey areas are not altered by filtering.

To solve this problem, the present invention, in the preferred embodiment, uses the weighted summation of several pre-defined filters to produced the filtered results. These filters are filters associated with a particular filter class; i.e., one filter class is enhance, one filter class is lowpass, and another filter class is "other". The digital filter of the present invention takes the form of $F_o = \Sigma \mu_i F_i$ where all of the $F_i$s correspond to the filters associated with each $i^{th}$ class (or classes) and $\mu_i$ corresponds to the membership of the image in the ith class, as determined by the fuzzy processing routine.

In a preferred embodiment of the present invention, the rules for the filtering classes are as follows:

If (pixel is "edge" or pixel is "pictorial" or pixel is "low frequency halftone"), then filter is ENHANCE; or If (pixel is "high frequency halftone"), then filter is LOWPASS.

Referring to the multiple "If's" in the above rules, the membership value of image in the class "ENHANCE" would be equal to the fuzzy value of the predicate, $\mu_{ENHANCE}$(filter)=max($\mu_{edge}$(pixel), $\mu_{lowfreqhalftone}$(pixel), $\mu_{pictorial}$(pixel)); and the membership value of image in the class "LOWPASS" would be equal to the fuzzy value of the predicate, $\mu_{LOWPASS}$(filter)=max($\mu_{highfreqhalftone}$(pixel)).

To implement the fuzzy screening, the processing system determines the membership value of the pixel in each of the classes associated with a particular screening process and assigns the maximum value as the membership value in the screening class. For example, if the pixel had membership values for "edge," "low frequency halftone," and "pictorial" of 0.6, 0.7, and 0.3, respectively, the processing system would decode the membership vector and assign a membership value to the ENHANCE class of 0.7. Moreover, if the pixel had membership values for "high frequency halftone" of 0.6, the processing system would decode the membership vector and assign a membership value to the LOWPASS class of 0.6.

To determine the actual coefficients for the various filters, the fuzzy processing system must ensure that the fuzzy filtering, resulting from the rule set, meets the constraint of a gain of 1.0 at the frequency $(\omega_1\omega_2)=(0,0)$. To alleviate this problem, one of the output filter choices is assigned the bypass function. In bypass, Vout=Vin; i.e.; no filtering is done. Thus, the resulting filter, according to the concepts of the present invention is $F_o = \Sigma \mu_i F_i + (1-\Sigma \mu_i)^* F_B$ such that when the desired effect is the bypass filter, the value goes to zero and the effect of the filter $F_i$ is ignored.

It is noted that the enhancement filter amplifies all higher frequencies, and the lowpass filter attenuates the higher frequencies. The coefficient value, c, for the bypass filter can be determined using $c_{bypass}=1-\mu_{enhance}$(filter)$-\mu_{lowpass}$(filter) so that the output filter can be described as $F_o = \mu_{enhance}$(filter)$^* F_{enhance} + \mu_{lowpass}$(filter)$^* F_{lowpass} + c_{bypass}{}^* F_{bypass}$.

Figure 7:
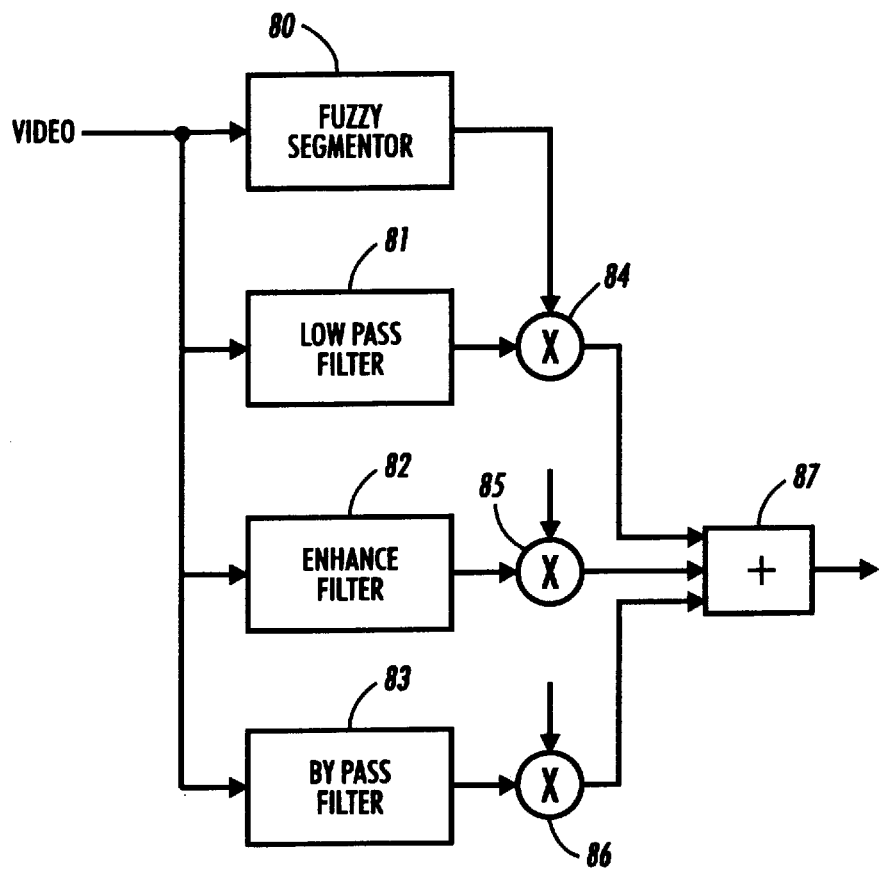
FIG. 7 is a block diagram of a digital filtering system incorporating the fuzzy classification process of the present invention.

An example of image processing an image using fuzzy classification with respect to filtering the image data is illustrated in FIG. 7. As illustrated in FIG. 7, video data or image data is fed into a fuzzy classifier 80, a lowpass filter 81, and an enhanced filter 82, and a bypass filter 83 in parallel. As described above, the fuzzy classifier 80 determines the membership vector of the pixel to be processed by the parallel set of filters. Note that this process includes buffers (not shown) to insure that the pixel being filtered corresponds to the correct membership vector being used to define the processing parameters.

Based upon this classification, the fuzzy classifier 80 will cause the overall filter to generate a set of coefficients which are applied to multipliers 84, 85, and 86. The coefficients will enable the overall filter to weight the output from the various filters according to the fuzzy image classification.

For example, as noted above, if the pixel had membership values for "edge," "low frequency halftone," and "pictorial" of 0.6, 0.7, and 0.3, respectively, the processing system would decode the membership vector and assign a membership value to the ENHANCE class of 0.7, which in turn is the filter coefficient assigned to the enhance filter 82 and fed to multiplier 85. Moreover, if the pixel had membership values for "high frequency halftone" of 0.6, the processing system would decode the membership vector and assign a membership value to the LOWPASS class of 0.6, which in turn is the filter coefficient assigned to the lowpass filter 81 and fed to multiplier 84. This leaves the generation of the coefficient for the bypass filter 83.

As noted above, the generated coefficients need a relationship such that the sum of the coefficients will not be greater than 1 so as to keep the gain of the overall output from the filters to be equal to 1. Thus, in the preferred embodiment of the present invention, the coefficient for the bypass filter is 1 minus the enhance coefficient minus the lowpass coefficient (in the example, 1−0.7−0.6=−0.3). This coefficient is applied to the multiplier 86. The weighted filter outputs are then fed into an adder 87 which adds all the outputs to produce a filtered pixel of image data which has been filtered according to its fuzzy image classification.

Although FIG. 7 illustrates the utilization of a fuzzy classifier with a plurality of different filters, the fuzzy classifier can also be utilized in connection with a modular time variant two-dimensional non-separable filter wherein the non-separable filter is made up of a plurality of separable filters.

The utilization of separable filters allows a non-separable particular form to be implemented in a cost effective manner. Moreover, a separable two-dimensional filter can be described as one-dimensional filter that acts in the vertical direction or slowscan direction followed by another one-dimensional filter acting in the horizontal or fastscan direction. Thus, the filter matrix can be described as the product of $F_{vh}=f_v*f_h$ wherein $F_{vh}$ is an N by M matrix, $f_v$ is a N length column vector (the vertical filter) and $f_h$ is a M length row vector (the horizontal filter).

If the matrix $F_{vh}$ cannot be represented using the above equation, the matrix is considered non-separable and the separable filter implementation cannot be used. However, if the N by M matrix is represented using a singular value decomposition such as $F_{vh}=U*S*V$, where U is N by N unitary matrix, S is an N by M diagonal matrix, and V is a M by M unitary matrix; a separable filter implementation can be used. Furthermore, if N and M are not equal, the above equation can be altered to $F_{vh}=U_r*S_r*V_r$, where $Q=\min(n,m)$, $U_r$ is a N by X submatrix of U, $S_r$ is a Q by Q submatrix of S, and $V_r$ is a M by Q submatrix of V. Putting this in summation form, the resulting representation will be $F_{vh}=\Sigma s(i)*u_i*v_i$, where i is greater than or equal to 1 but less than or equal to Q.

In this representation, the vector s(i) is a diagonal of the matrix $S_r$, $u_i$ is the $i^{th}$ column vector of $U_r$, and $v_i$ is the $i^{th}$ column vector of $V_r$. Each component is a separable filter similar to that described above with the exception of a gain factor s(i). In other words, any non-separable filter of length N by M can be represented as the weighted summation of Q separable N by M filters. Thus, to implement a non-separable filter using the weighted averages of several of the filters, the hardware becomes a conglomeration of Q separable filter modules, Q multipliers, and an adder.

Although the above described fuzzy classification system resolves some of the problems with pixel classification, the method described to implement this system does not necessarily provide flexibility nor maximum efficiency. What is desired is a segmentation architecture which allows flexibility and efficiency such that the rules for classification can be readily changed in the system as new information is uncovered about the nature of printed documents or a user desires to override a certain process on the fly.

One embodiment of the present invention provides an architecture which provides the above features. This architecture consists of imposing a rigid partitioning of the segmentation process into three parts. A better understanding of this concept can be seen in the illustration of FIG. 10.

Figure 10:
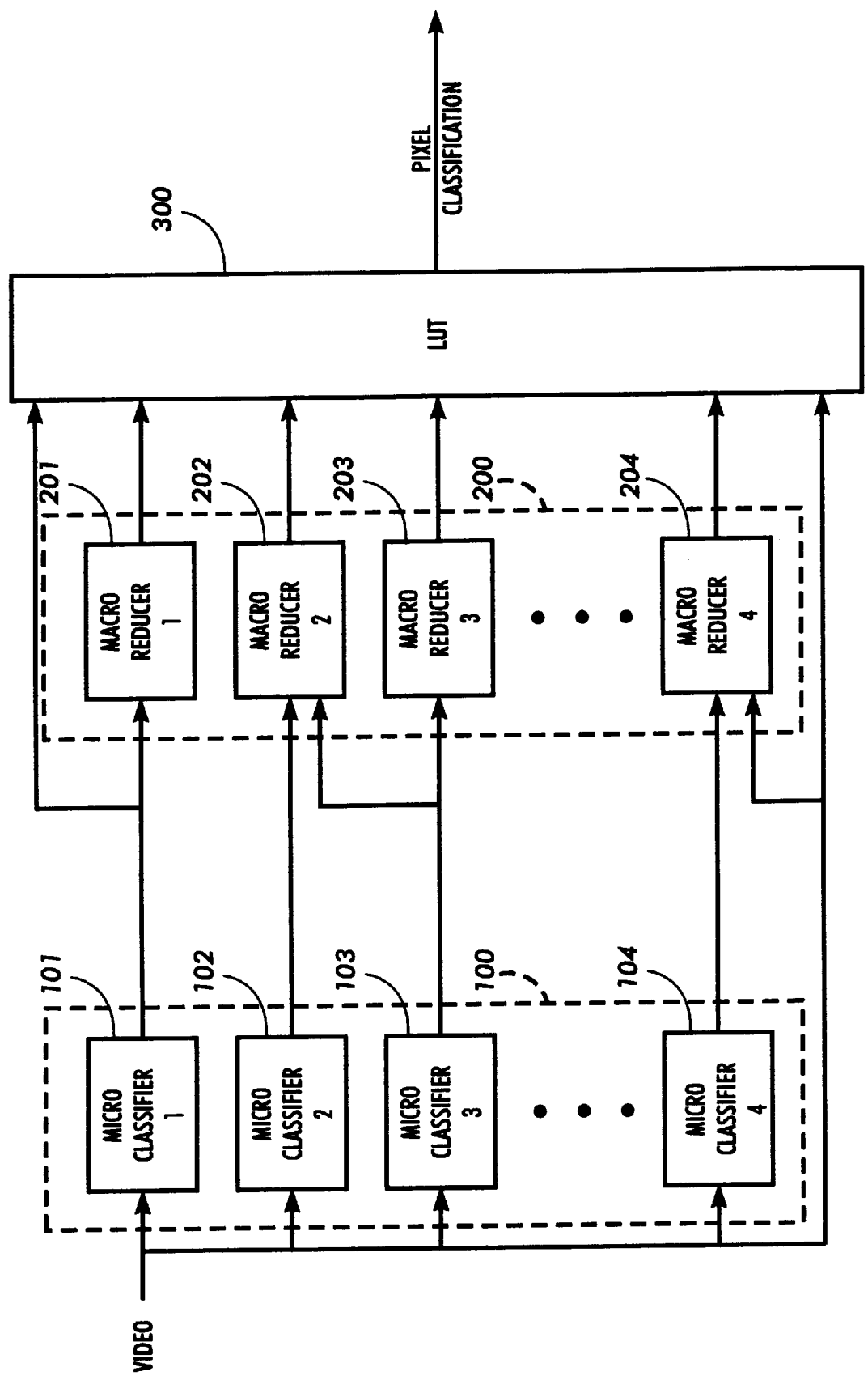
FIG. 10 is a block diagram illustrating a scalable image classification system architecture according to the concepts of the present invention.

FIG. 10 illustrates a block diagram of a flexible classification/segmentation system. As illustrated in FIG. 10, the video signal or image data is fed into a microclassifier system 100, a macro-reduction system 200, and a pixel classification look-up table 300. The microclassifier system 100 is made of a plurality of microclassifier circuits 101–104. Microclassifier circuits measure intrinsic properties of the video extracted through a simple mathematical formula or heuristic. Examples of microclassifiers might be detected video minimums or maximums, Laplacian, Sum of Laplacians, Average, Range of Raw Video, Range of Average Video, etc. as used in all of the references. The microclassification values are fed into the macro-reduction system 200.

The many microclassifiers in this embodiment have different magnitudes when computed for images of different types. Table 1 lists qualitatively the magnitude of the microclassifiers for different image types.

TABLE 1

| | Halftone Gray | Halftone Shadow | Text Edge | Contone Gray | Contone White | Contone Black |
|---|---|---|---|---|---|---|
| Video Peak Count | Varying Frequency Dependent | Varying Varying | Varying Near Zero | Varying Near Zero | High Near Zero | Low Near Zero |
| Sum of absolute Laplacian in X x Y* | High | Low | Highest | Low | Low | Low |
| Range of Video in 5 x 5 | Highest | High | Highest | Low | Low | Low |

*X = 7, 11 and Y = 3, 5 for resolution of 400 spi and 600 spi, respectively.

The magnitude of the responses of the microclassifiers shown above suggests the following microclassification rules expressed in a pseudo code.

Vij=Video of the j-th pixel in the i-th scanline.

Nij=Peak Count centered at the j-th pixel in the i-th scanline.

Sij=Sum of Absolute Laplacian of Video at the j-th pixel in the i-th scanline.

Rij=Range of Video in 5×5 context centered at the j-th pixel in the i-th scanline.

N16>N15> . . . >N1=Thresholds in Peak Counts for Halftones of classes with frequencies HFT16> HFT15> . . . HFT1

S3>S2>S1=Thresholds in Sij.

R1=Threshold in Rij.

V2>V1=Thresholds in Vij.

```
If(Nij >= N1 AND Sij >= S2 AND Rij >= R1 {
   If (Nij < N2)
      Class = HFT1
   else if (Nij < N3)
      Class = HFT2
   else if (Nij < N4)
      Class = HFT3
   else if (Nij < N5)
      Class = HFT4
   else if (Nij < N6)
      Class = HFT5
   else if (Nij < N7)
      Class = HFT6
   else if (Nij < N8)
      Class = HFT7
   else if (Nij < N9)
      Class = HFT8
   else if (Nij < N10)
      Class = HFT9
   else if (Nij < N11)
      Class = HFT10
   else if (Nij < N12)
      Class = HFT11
   else if (Nij < N13)
      Class = HFT12
   else if (Nij < N14)
      Class = HFT13
   else if (Nij < N15)
      Class = HF14
   else if(Nij < N16)
      Class = HFT15
```

-continued

```
        else
            Class = HFT16
    } else if (Sij >= S3) {
        Class = EDGE
    } else {
        if(Vij < V1)
            Class = BLACK
        else if(Vij >= V2)
            Class = White
        else {
            if(Sij >= S1)
                Class = CONTONE ROUGH
            else
                Class = CONTONE SMOOTH
        }
    }
}
```

In the microclassification rules shown above, the halftone class is divided into 16 frequency intervals as an example. The multiple halftone classes allow an adaptive filtering and rendering of the halftone areas. It eliminates classification artifacts resulting from simply dividing the halftone classes into high and low frequency halftones only. The continuous tone is also divided into two sub-classes, smooth and rough, based on the sum of the absolute Laplacian. This allows for more optimized rendering of the continuous tone area. More specifically, the multiple frequencies are used to realize the advantages of a true fuzzy classification system through a discrete implementation. The subclasses are created as a way to gradate the overall classification, thus reducing the need for fuzzy classification. In a classification fuzzy system, there would be fewer classes, for example low, medium and high frequency.

A variant of the above microclassification rules is obtained by replacing the statement "else if(Sij>=S3)" with "else if(Sij>=S3 AND Rij>=R1)" to obtain a more robust determination of the edge class membership value.

The macro-reduction system 200 is made of a plurality of macro-reduction circuits 201–204. Each macro-reduction circuit reduces microclassification values received from the microclassifiers to produce higher level, more directly useful information through mathematical operations and heuristics, suppressing noise and other irrelevant or undesirable variations in the microclassifiers. These are often non-linear operations. Examples of macro-manipulations or reductions might be to count video minimums or maximums in the neighborhood of a pixel, implementing a running average with a controllable attack, decay, and heuristic conditions, performing an auto-correlation on detected peaks, or combining two or more microclassifiers to compensate for undesirable fundamental effects. The macro-reduced values are fed into the pixel classification look-up table 300.

The pixel classification look-up table 300 reduces the macro-reduced outputs to the final classification through a run-time programmable mechanism. The look-up table 300 also enables any arbitrarily complex function to be performed, since the arbitrarily complex function can be pre-calculated off-line and loaded into the table. Microclassification values or even the input video may also be used to directly drive the programmable table 300 if appropriate. Use of a programmable table enables quick modification of the classification algorithm when requirements change or as understanding the properties of images grows, albeit within the framework presented at the input of the table.

Figure 11:
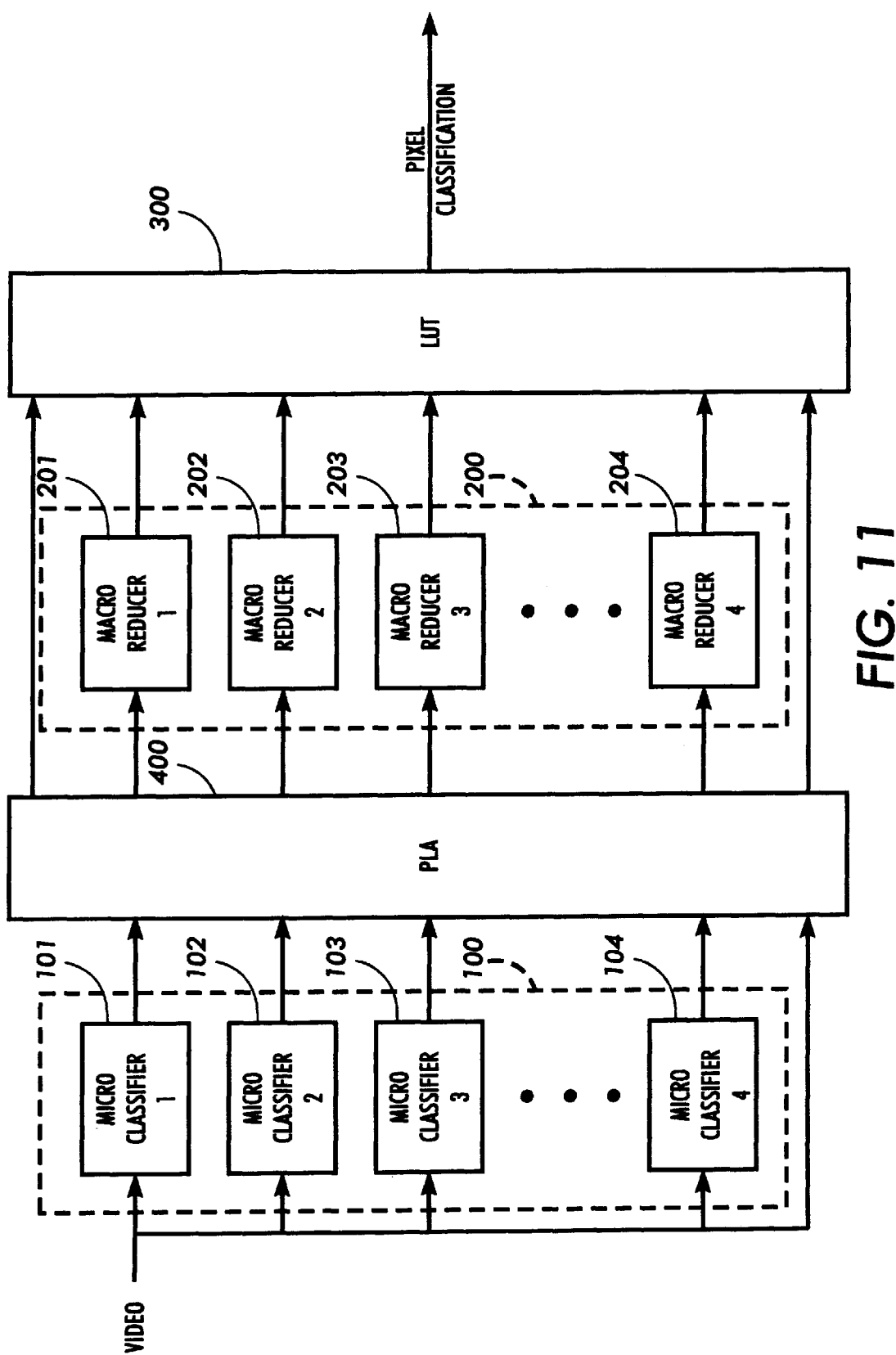
FIG. 11 is a block diagram illustrating another scalable image classification system architecture according to the concepts of the present invention.

This architecture can be further modified to add more flexibility as illustrated FIG. 11. As illustrated in FIG. 11, a programmable logic array 400 is placed between the microclassifier system 100 and the macro-reduction system 200. The programmable logic array 400 includes a plurality of circuits, gates, and multipliers which is programmed to control which microclassification value goes to which macro-reduction circuit and what is the weight of that value. This programmable logic array 400 enables the user or technician to reprogram the overall segmentation algorithm by allowing for the programmability of the feeding of the microclassification values to the macro-reduction circuits. Such a programmable logic array could also be included between the macro-reduction system 200 and the programmable look-up table 300 to add maximum flexibility.

In any of the architectures described above with respect to FIGS. 10 and 11, each stage can be easily scaled and interactions added or removed as requirements change. Microclassifiers can also be removed to save cost or added to extract new kinds of information from the document. Macro-reductions can be removed to save cost or added when new interrelationships are discovered or better methods of reducing the microclassifier outputs are developed. The lookup table can be expanded to bring a higher level of programmability up to the user or reduced to save cost. Lastly, such architectures enable classifications to be dynamically added, removed, or their defining attributes modified both between and within pages of a multiple page image processing job.

As noted above, various types of information about the image is needed to provide a proper image type classification of the image data. The information varies from determining the peaks in the video stream to determining the sum of the absolute values of the Laplacian of the video stream. One important tool in determining some of the needed information is filtering. Filtering has been utilized in various segmentation systems. Such filtering is essential in the measurement or estimation of the halftone frequency of the video signal or image data.

As noted above, methods for classifying image pixels according to document types; e.g., text, continuous tone, and halftones of various techniques and frequencies; make decisions based on image context in the vicinity of the pixel being classified. A critical piece of information extracted from the context is the estimate of the halftone frequency. The frequency is commonly estimated from a count of halftone peaks within the context. Such a count is really simply the application of a two-dimensional blur filter with rectangular amplitude profile in the space domain.

One embodiment of the present invention is directed to an efficient and inexpensive method for implementing a triangular blur filter to produce either a low pass or a high pass filter. The high pass filter is derived by the usual conventional method of subtracting the low pass output from the original input. The implementation of the present invention requires only two adders and two delay elements and no multipliers. In addition, the present invention provides for inexpensively re-synchronizing data, which is delayed due to the filtering, with any associated input tags wherein tags can be any auxiliary data associated with the image data or video stream, such as image classification information.

In implementing the filter, the present invention redundantly performs the calculation on the trail edge instead of storing the result to use it later. This is only done in the slowscan direction. In the fastscan direction, the results are stored in a series of latches. The reasoning behind this implementation will become more clear from the description below.

In the fastscan direction, the "calculation" is that of taking gray input video and detecting peaks, yielding a 1-bit output.

Conventionally, it is a very expensive operation because it requires a large number of gates. On the ohter hand, it is inexpensive to delay this one bit output by a few pixels (8–18) with flip-flops, so it is delayed. In the slowscan direction, the "calculation" is a peak counter within an one-dimensional window, inputting a 1-bit number and yielding a 4-bit number. This 4-bit result would have to be delayed 8–18 scanlines, times some 5000 pixels per scanline, costing several hundred thousand flip-flops, or more likely an external RAM and control circuitry.

In view of this inefficiency, the present invention duplicates the first-pass block to recreate the result when and where needed during the second pass rather than using the conventional method of taking the output of the first pass and providing it as input to the second pass as two pure blocks.

For many different applications, it is desirable to filter a given input signal or image. Typically for signal and image processing applications, finite impulse response filters are preferable because of several properties these filters possess, specifically, linear phase and guaranteed stability. In addition to the input/video that is to be filtered, additional properties/data associated with the input signal/video may be coupled with the signal/video as it flows through the system. This additional information may be processed by or control downstream modules. This additional information often contains information corresponding to the classification of the individual pixels of the signal/video, such as membership information, and may be referred to as the signal/image tag or a classification vector. In the description below, the tag at a certain time/position k will be referred to as T(k). Thus, the entire input to be processed is the union of both the signal/video plane and one or more tag or classification vector planes.

For the application of filtering, it is desirable to filter the signal/video input and then take the corresponding output and reunite it with the appropriate tags. An example of such an application of filtering can be expressed utilizing the following equation for a rectangular filter of length 2N+1.

$$H(z) = \Sigma_i z^{-i}, \quad i + \{-N, -N+1, \ldots 0, \ldots N-1, N\}$$
$$y(k) = \Sigma_i x(k+i), \quad i + \{-N, -N+1, \ldots 0, \ldots N-1, N\}$$

In these equations, H(z) is the z-transform of the filter and x(k) and y(k) are the inputs and outputs of the filter, respectively. Although this filter has poor frequency response characteristics, it is often used because it is very inexpensive to implement.

In order to implement a rectangular filter in real time and inexpensively, the following rectangular filter is conventionally utilized.

$$H(z)=(1-Z^{-2N-1})/(Z^{-N}-Z^{-N-1})$$

$$y(k-N)=y(k-N-1)+x(k)-x(k-2N-1);$$

To get the present sum from the above equation, the previous sum is used and one video input is subtracted while another is added. In addition, none of the terms H(z) are functions of positive exponents of z and thus they do not depend on future values of x, only on the present and previous values. This type of rectangular filter makes it easy to implement in real time and/or in pipeline systems where all of the data is not available at once but is presented serially to the filter. Unlike a typical filter, which requires several values of the input and several multipliers/adders, all that is needed to implement this rectangular filter is a delay element of 2N+1 and two adders.

Unfortunately, it is noted that at time (or position) index k, the output is known up to time k−N. At this time however, the tag or classification vector is at time k, T(k) is the value available in the pipeline. In other words, the output video and the associated tag or vector have become unsynchronized. In order to re-synchronize the output signal/video with the proper tag, the tags must be delayed by N sample times. The overall configuration therefore requires one signal to be delayed by N (the tags), and another signal be delayed by 2N+1 (the video). If expensive first-in first-out (FIFO) buffers are utilized for these delays (as in the case of two-dimensional image processing), the expense of the two delay blocks can be very large. In addition, such an implementation would require two different lengths of FIFO buffers or two identical FIFO buffers controlled differently.

Furthermore, a single rectangular filter is not the optimal filter to utilize because its side lobes in the frequency domain are very significant. Thus, to create a better filter, one embodiment of the present invention utilizes a rectangular filter that is used successively to provide an equivalent triangular filter wherein the triangular filter is generated by the convolution of two rectangular filters. Such a triangular filter can be expressed utilizing the following equations.

$$z(k-2N-1)=z(k-2N-2)+y(k-N-1)-y(k-3N-2);$$

$$y(k-N)=y(k-N-1)+x(k)-x(k-2N-1);$$

In the above equations, y(k−N) is a first state sum as in a rectangular filtering and z(k−2N−1) is the final output from the triangular filter. This triangular filter equation can be reduced to:

$$z(k)=\Sigma(2N+1-|i-2N-1|)x(k+i-2N-1), i=0 \text{ to } 4N+1$$

Figure 21:
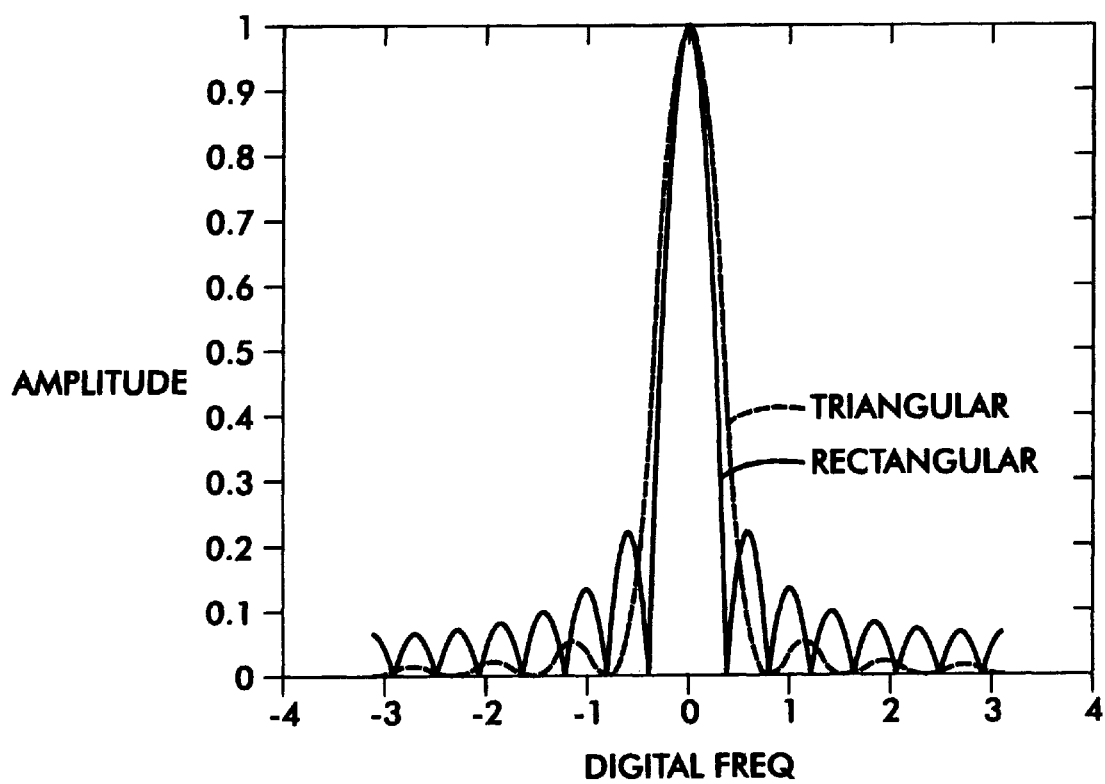
FIG. 21 is a graphical representation of a comparison between a frequency response of a triangular filter and a rectangular filter according to the concepts of the present invention.

The triangular filter has superior frequency properties when compared to a rectangular filter as clearly illustrated in FIG. 21. FIG. 21 shows the Fourier transform of both filters when each is 15 elements long. It is noted that to implement this triangular filter, the triangular filter requires four adders/subtractors. In addition, the triangular filter requires the use of two delay blocks instead of one but both have a fixed delay of 2N+1. If a single delay block is wide enough, it can be used to delay both the tags/vectors and the signal. In other words, instead of two delay blocks, a single block of twice the bit width can suffice.

Additionally, the triangular filter has the property that the overall delay between the input and output is 2N+1, unlike the delay of N in the rectangular filter. Thus, utilizing a triangular filter requires that the tags t(k) be delayed by 2N+1 to be re-synchronized with the output video. This delay is identical to the delay needed for the input signal x(k), an intermediate state y(k) in the equation above describing the triangular filter. Therefore, the same type of delay block can be used for the image elements as well as the tags. If the wordlength of the delay block is large enough, a single delay block can be used to delay x(k), y(k), and t(k). The triangular filter can be implemented using only a single delay element of 2N+1 states with four adders and subtractors. In addition, one multiplier can be used to normalize the filter so that it is low pass in nature with a unity gain. The normalization can also be done at the end of the first state: i.e., on y(k) to reduce the bit to be carried into the second state sum.

With only minimal additional hardware, a rectangular filter can be easily replaced by a triangular filter, which has better frequency response characteristics. Moreover, the tags in the signal can be readily re-synchronized using common hardware to that which is needed by the filter itself. In addition, the triangular filter can be used to implement a high pass filter as well. The signal/video input can be delayed along the tag vector so that at every index k there is the original signal, the low pass signal (via the triangular filter) and the tags. The high pass filter output is easily created by subtracting the low pass output from the original input video.

This process can be repeated to provide "smoother" low pass filters wherein the filter becomes Gaussian as the procedure is infinitely repeated. The cost per stage is linear, but the incremental benefits of the low pass filter and the frequency response decrease rapidly with each additional stage.

Finally, the process discussed above can be extended to two dimensions by using a triangular filter in the horizontal direction and a triangular filter in the vertical direction. An example of a typical application of a two-dimensional filter is the utilization of a two-dimensional rectangular function to estimate the spacial frequency (measured in lines per inch, or LPI) of a halftone image given the peak map of the image. More specifically, such an estimation of the frequency is needed in any process requiring automatic halftone detection such as automatic image segmentation. In such an application, a filter is used to process a peak map and thereafter each point is converted to a frequency estimate by taking the square root of the peak count within a context centered on the pixel whose containing halftone cell's frequency is being estimated and multiplying it by a constant which is a function of the filter size. An ideal frequency measurement map would have a standard deviation of 0.0 since the input image is a constant halftone.

As discussed earlier, the triangular filter can be implemented as the convolution of two successive rectangular blur filters. This implementation has the advantage of maintaining synchronization between the video being filtered and any information in a parallel channel, such as classification tags. Therefore, determining the optimal implementation of a two-dimensional triangular filter reduces to the problem of determining the optimal implementation of a two-dimensional rectangular blur filter. Furthermore, while the desire to minimize cost and complexity drives toward filtering of tiled rectangular blocks at fixed locations in the image, this leads to rectangular artifacts in the classification map, which in turn results in objectionable rectangular artifacts in the resulting image whose processing is driven by this map. This understanding adds the additional requirement that the optimal implementation of a two-dimensional triangular filter must filter each pixel based on a context which is centered on that pixel.

The present invention provides a fast, hardware efficient method of achieving the goals outlined above: [1] Implementing two concurrent two-dimensional rectangular blur filter on a raster image flowing through a pipeline, yielding a triangular filter, [2] Filtering based on a context centered on each pixel being filtered, thereby avoiding rectangular artifacts, and [3] Maintaining synchronization of the filtered output image with a unfiltered auxiliary data channel. In the event that the data needs to be processed through additional rectangular blur filters to obtain better frequency characteristics, only one set of control circuitry is required for all instances.

To better explain the two-dimensional rectangular blur filter of the present invention, FIGS. 22 through 24 will be described below.

FIG. 23 is a block diagram of a circuit which detects the peaks of the video stream and counts the number of peaks within a programmable neighborhood around the pixel being classified. The video stream is received by a peak detection circuit 600 which detects the peaks within the video stream utilizing conventional peak detection methods. This circuit outputs a binary 1 if a peak is detected and a binary 0 if no peak is detected. The peak detection information is fed into a peak counter circuit 500 wherein the number of peaks in the context neighborhood is determined.

The peak counter circuit 500 includes a programmable delay line 602 which provides trail edge peak detection information. In other words, to determine the number of peaks in a neighborhood that is moving as the classification process goes from one pixel to the next pixel, the counter must not only count the incoming peak detection information, but must also remove the peak information relating to pixels now outside the neighborhood. The programmable delay line 602 provides the trail edge peak detection information which is the peak information relating to pixels now outside the neighborhood. The delay line 602 is programmable so that the system can be programmed to implement varying target neighborhood sizes based on image resolution, apriori knowledge of the document being segmented, and system level tradeoffs.

The trail edge peak detection information, along with the current peak detection information from the peak detection circuit 600, is fed into a peak counter 604 which adds the current peak detection information to a current count, provided by a latch circuit 606 and subtracts the trail edge peak detection information provided by the programmable delay line 602 from the current count. In this way, the peak counter 604 can provide an accurate current count to the latch 606.

One way to implement a two-dimensional rectangular blur filter using the peak detection/counter circuitry of FIG. 23 is illustrated in FIG. 24. The video stream, as illustrated in FIG. 24, is received by a peak detection circuit 600 which detects the peaks within the video stream utilizing conventional peak detection methods. This circuit outputs a binary 1 if a peak is detected and a binary 0 if no peak is detected. The peak detection information is fed into a fastscan lead edge peak counter circuit 608 wherein the number of peaks in the context neighborhood is determined. The fastscan lead edge peak counter circuit 608 contains the same components as the peak detection circuit 500 of FIG. 23.

Since the filtering needs to be done in two dimensions, the peak information within a context extending in the slowscan direction must also be included in the peak count determination. To facilitate the inclusion of slowscan peak count information, a slowscan trail edge FIFO buffer 610 is included. A slowscan lead edge peak counter is not required because the scanning on the image data is along the fastscan direction such that when the scanning moves to the scanline, the peak information for that scanline will be provided by the fastscan lead edge peak counter 608 as it scans across the image data, whereas the slowscan trail edge FIFO buffer 610 will provide the slowscan peak count information that needs to be removed from the accumulated count because that scanline is no longer part of the neighborhood being analyzed. This FIFO buffer 610 must be large enough to store information for each pixel in the fastscan direction (typically on the order of 2,500–10,200 pixels) and for the number of scanlines that define a neighborhood.

The peak count information from the fastscan lead edge peak counter 608 is fed to a summer 612 and the slowscan trail edge FIFO buffer 610. The summer 612 adds the peak count information from the fastscan lead edge peak counter 608 to a previous count value for that pixel column that was stored in a scanline FIFO buffer (not shown) to generate the real count value for the pixel being classified. This real count value is also fed into a summer 614 wherein the real count value is modified so that the peak count information from the slowscan trail edge is removed. This modified value is stored in the same scanline FIFO buffer.

The system in FIG. 24 produces a two-dimensional rectangular blur filter that eliminates rectangular artifacts induced by the filter, but requires large amounts of high speed memory, thus having a negative impact on its cost. FIG. 22 illustrates another implementation of a two-dimensional rectangular blur filter which does not require a large amount of memory and produces identical results.

Figure 22:
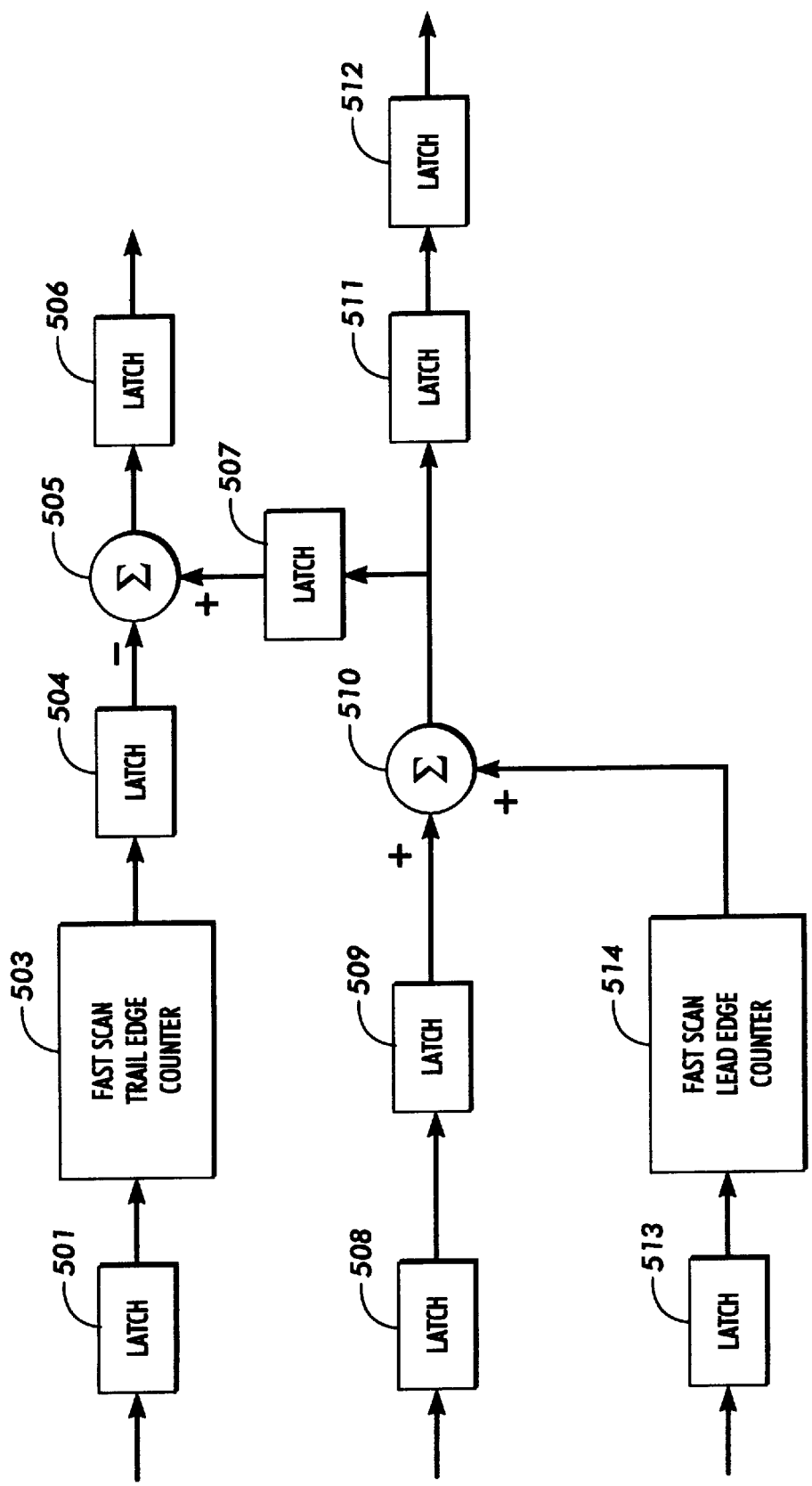
FIG. 22 is a block diagram illustrating an architecture for a parallel two-dimensional blur filter according to the concepts of the present invention.

As illustrated in FIG. 22, peak detection information from a peak detection circuit (not shown) is received by a latch 501. The latched information is fed to a fastscan trail edge peak counter 503 which has essentially the same contents as peak counter 500 in FIG. 23. The trail edge count information is fed into a latch 504 and this latched information is fed into a summer 505.

Peak detection information from a second peak detection circuit (not shown) is received by a latch 513. The latched information is fed to a fastscan lead edge peak counter 514 which has essentially the same contents as peak counter 500 in FIG. 23. The lead edge count information is fed into a summer 510. Summer 510 also receives latched peak count information from latches 508 and 509. This latched information represents the old count value that had been stored in a scanline FIFO buffer (not shown). The resulting sum from summer 510 is the current count value for the pixel being classified as it leaves the latching circuit of latches 511 and 512.

The resulting sum from summer 510 is also fed to summer 505 through latch 507 wherein summer 505 subtracts the latched count value of the fastscan trail edge counter 503 from the latched summed value from summer 510. This value is latched by latch 506 before being stored in the scanline FIFO buffer. It is noted that the various latches in FIG. 22 are merely for keeping the various counts for the active pixel column properly synchronized with the pixel image data, and thus, these latches do not go to the crux of the invention since more or less latches may be needed in order to maintain this synchronization depending on detailed design details.

The operations of the two-dimensional rectangular blur filter as illustrated in FIG. 22 will be more precisely described below.

In order to calculate the output of the blur filter for a context trail edge pixel position in both the fastscan and slowscan directions, two fastscan blur filters (one at the slowscan lead edge of the context and one at the slowscan trail edge of the context) feed P slowscan filters wherein P is the number of pixels per scanline in the fastscan direction. The state of the P slowscan blur filters is stored in a ring buffer and restored, updated, and saved every clock cycle as each pixel's contribution is incorporated. The details of the process are as follows:

The filter of the present invention blurs pixels in a 1 pixel slowscan by N pixel fastscan strip as it slides in the fastscan direction at the slowscan lead edge of the incoming image:

| Given: | N: | Fastscan length of the blur filter |
|---|---|---|
| | X: | Current pixel position on the scanline. |
| | $V_X$: | Input video value at the current pixel position. |
| | $FSPS_X$: | Fastscan Partial Sum consisting of the sum of the N-1 input pixels preceding the current pixel on the scanline. |

The blur filter output consisting of the sum of the N pixels trailing and including the pixel at position X is $FSBLUR_X = FSPS_X + V_X$ and the new partial sum for the next column position is: $FSPS_{X+1} = FSBLUR_X - V_{X-(N-1)}$. The N-1 trailing video values are saved in a FIFO P elements long so that random and repeat access to the image is not required. At each pixel location $V_{X-(N-1)}$ is immediately available from the output of the FIFO and $V_X$ is written to the input.

An output image consisting of the fastscan blurred video can then be piped into a similar process to perform the slowscan blurring. However since the data is presented in a fastscan/slowscan raster format in order to blur each column by M pixels in the slow scan direction, M full scanlines of $(BPP + \lceil Log_2 N \rceil)$ bit wide storage would be required wherein BPP indicates the number of bits per pixel. Instead, the original BPP bit wide input data can be delayed and presented to a second fastscan blur block identical to that described above. This second fastscan blur can concurrently recalculate the required quantity ($FSBLUR_{X,(Y-(M-1))}$ in the description below) for use by the slowscan blur operation.

In the event that the original BPP bit wide input data is already being delayed and presented at the slowscan trail edge for other reasons, this in effect saves all M scanlines by $(BPP + \lceil Log_2 N \rceil)$ bits of storage. For example, if BPP=1 and N=16, 5 bits wide by M scanlines of storage are saved. If multiple instances of the rectangular filter are applied, $\lceil Log_2 N \rceil$ bits by M scanlines of storage are saved over the $(BPP + \lceil Log_2 N \rceil)$ required where the fastscan blurred video is simply piped to a second stage. This process is described in detail below.

For each column in the fastscan blurred image, the filter of the present invention blurs a M pixel slowscan by 1 pixel fastscan strip as it slides in the slowscan direction at the slowscan lead edge of the incoming image.

| Given: | M: | Slowscan length of the blur filter |
|---|---|---|
| | X: | Current column position |
| | Y: | Current scanline position |
| | $FSBLUR_{X,Y}$: | Value at the current column/scanline position of the fastscan blurred input video |
| | $FSBLUR_{X,(Y-(M-1))}$: | Value M-1 scanlines up from the current position of the fastscan blurred input video. |
| | $SSPS_{X,Y}$: | Slowscan Lead Edge of context Partial Sum consisting of the sum of the M-1 fastscan blurred values in a column above the current position. |

The slowscan blur filter output consisting of the sum of the M Fastscan blur filter output values trailing and including the pixel at position X,Y is $SSBLUR_{X,Y} = SSPS_{X,Y} + FSBLUR_{X,Y}$, and the new partial sum for the next row, same column position is $SSPS_{X,(Y+1)} = SSBLUR_{X,Y} - FSBLUR_{X,(Y-(M-1))}$.

In the fastscan case, the new partial sum would be used on the next pixel processed. However in the slowscan case, because of the fastscan/slowscan raster presentation of the data, the column-wise partial sum must be saved until the same column in the next row is processed. Since each value is created only once, used only once, and every value is used P-1 pixels after it is created, the column partial sums can be saved in a FIFO memory. For each column, the partial sum for the current position is stored during the previous row. This value is read from one end of the FIFO, and the new partial sum calculated for the current column is written to the other. The next FIFO read will be the partial sum for the next column position. These operations are saving and restoring the state of the P slowscan blur filters which exist for each of the P pixel columns in the image.

It is noted that while the overall two-dimensional blur filter requires storage for M−1 scanlines of the original image, access is only needed at the upper and lower right corners of the blur rectangle. A FIFO memory can be used, thereby reducing control circuitry and Input/Output pins required to a minimum: data input/output and simple read/write signals. If multiple passes through a rectangular blur filter are required to achieve a frequency response with lower side lobes, a second instance of the process described above can be implemented concurrently, with the M scanline FIFO memory element and the per column accumulator storage being made wider but using the same control circuitry as the first stage. In this case, the present invention's use of a duplicate fastscan blur block in the second stage saves $[\text{Log}_2 M*N]$ bits in width of the M scanlines of storage. If N equals 10 and M equals 15, the M scanline FIFO memory element width required by the second filter is reduced by $[\text{Log}_2 150]=8$ bits over the conventional sequence approach of implementing a separable two-dimensional filter.

Advantages from the above-described 2-D blur filter implementation are that access to the data is required only after a single fix delay, thereby allowing the use of FIFO storage elements. Replication of critical functions reduces the required width of the FIFO storage elements. Regularity in the process utilizing the rectangular blur filter allows multiple instances of the filter to be ganged together, thereby sharing control circuitry in processing the data concurrently to realize multiple passes through the filter without a corresponding increase in cost and complexity.

Moreover, peak detection routines are often used in image processing to help find maximum and minimums of the images. In halftone detection algorithms, the peak detection is often used in determining the dot density or frequency of the halftone being measured. This is a common measurement used in segmentation. In many detection routines, the maximum is found by searching for a local pixel that is greater than all its neighbors.

The problem with this process is that it ignores flat top peaks; i.e., peaks that are more than 1 pixel in width. In order to overcome this problem, one can require that the pixel is greater than or equal to all of its neighbors. The problem associated with this implementation is that the flat top area may be present as multiple pixels. As an example, utilizing a peak function P(i, j) which is one where there is a maximum, and zero otherwise, a typical peak detection process for pixel in the i-th scanline j-th pixel location is as follows:

Peak($i,j$)=1 iff $v(i,j)>v(i-k,j-l)$, with $-1 \leq k$, $1 \leq l$ and $k$ and $l$ are not both zero, otherwise 0

If there are dual peaks, for example: $v(i,j)=v(i+1,j)$, neither (i,j) or (i+1,j) will be considered locations of a local maximum. This process will therefore tend to underestimate the number of local maximums of the image. In halftone measurements, this would result in a frequency estimate lower than the true frequency. Similarly, if the strict inequality in the equation set forth above is changed to a weak inequality ($\geq$), all flat top peaks will be counted multiple times, and this will tend to overestimate the number of local maximums in the image.

To correct for these problems adjacent peaks can be disallowed where the peak pixel and all intervening pixels are at the same video level as another peak. This unfortunately increases the complexity of the process and requires that the local peak mass be stored for future calculations. In terms of implementation, this is costly because storing line buffers for real-time calculations is expensive in high speed systems.

One embodiment of the present invention resolves this problem with a combination of the strict and weak inequality. The implementation of the weak and equality can be direction sensitive. It is only imposed at a particular direction: e.g., down and/or to the right. In this case, the inequality in the above equation is changed to:

Peak($i,j$)=1 iff $v(i,j) \geq v(i+k,j+l)$, with $(k,l)=\{(0,1), (1,-1), (1,0), (1,1)\}$ $v(i,j)>v(i+k,j+l)$, with $(k,l)=\{(-1,-1), (-1,0), (-1,1), (0,-1)\}$ This inequality will count multiple peaks only one time, since it only allows it as it approaches from only one direction. In this example, it will consider the upper left to be the peak location. Unfortunately, this process has also a shortcoming. The process will detect peaks in areas where staggered lines are encountered. The upper left area of each jagged section will be detected as a local maximuim This type of staggering is, for example, in text areas where diagonal lines are present such as in part of the letter A. In many instances, the detection of these areas as peaks many not be undesirable. For halftone detection, however, it may result in a false detection of a halftone area.

In order to eliminate detecting local maximums in this area, the second equation above is updated to place the diagonal inequality in the upper left. This eliminates block areas that are typically present in text. The updated peak detection is as follows:

Peak($i,j$)=1iff $v(i,j)>=v(i+k,j+1)$, with $(k,l)=\{(-1,-1), (31\ 1,1), (0,1), (1,0)\}$ $v(i,j)>v(i+k,j+1)$, with $(k,l)=\{(-1,0), (0,-1), (1,-1), (1,1)\}$ If this peak detection is utilized on a halftone gray original at 100 lines per inch with 45 degree orientation. Under ideal peak detection, the peak map will form a hexagonal grid. Thus, given perfect peak detection, the frequency measurement would have a mean of 100 and a standard deviation of 0. Using the first described peak detection process above, the mean of the frequency measurement would be 91.5 lines per inch, the range 61 lines per inch to 100 and 9 lines per inch and the standard deviation 5.6 lines per inch. Using the third described peak detection, the mean frequency is 99 lines per inch, range 91 lines per inch to 111 lines per inch and the standard deviation is 2 lines per inch.

As noted above, the detection of halftones is very important. The detection of halftones involves finding the center of the halftone dots and counting the number of dot centers in a small window. The presence of enough numbers of dots as well as additional conditions qualifies an area as a halftone. The frequency of the halftone can be inferred from the dot counts in the window of a known size. The dot centers are identified by finding the local video minimums in the mid-tone to highlight area and finding the local video maximums in the mid-tone to shadow areas. To suppress false detections in a noisy non-halftone area, the center pixel is required to be less than the average of the surrounding pixels by a small threshold in case of minimums and greater than the average of the surrounding pixels by a threshold in case of maximums.

The process described above usually detects the halftone area accurately. However, in images with small kanji, thin lines, or ladder charts, noises in the lines can trigger false detection of halftone dot centers. If there are enough halftone peaks, the local area could be classified as halftone rather than text or line arts. The kanji or ladder charts would then be treated as high frequency halftones, thereby causing the kanji or ladder chart image data to be low pass filtered and screened. The result is the loss of sharpness in reproduction. Thus, additional constraints are necessary in qualifying the pixel as a halftone peak. One embodiment of the present invention provides an efficient way to reduce the number of false detections of halftones in these areas.

Figure 13:
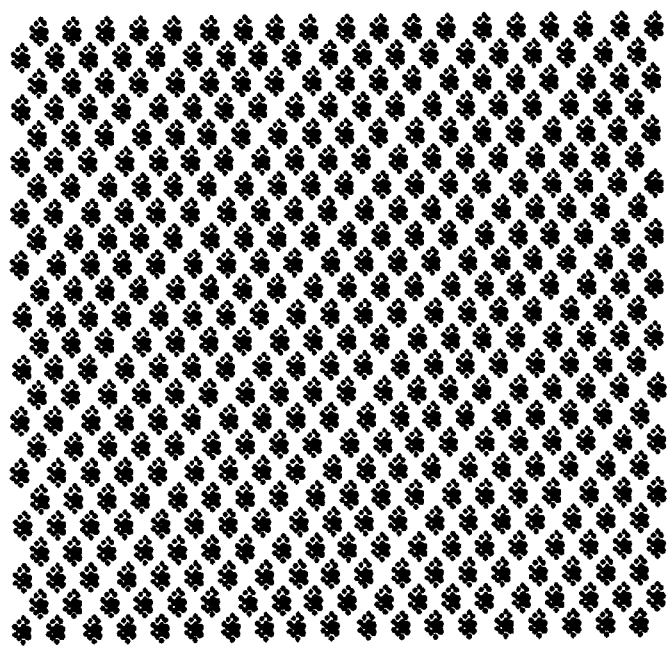
FIG. 13 is a graphical representation of an enlarged view of a halftoned area.
Figure 14:
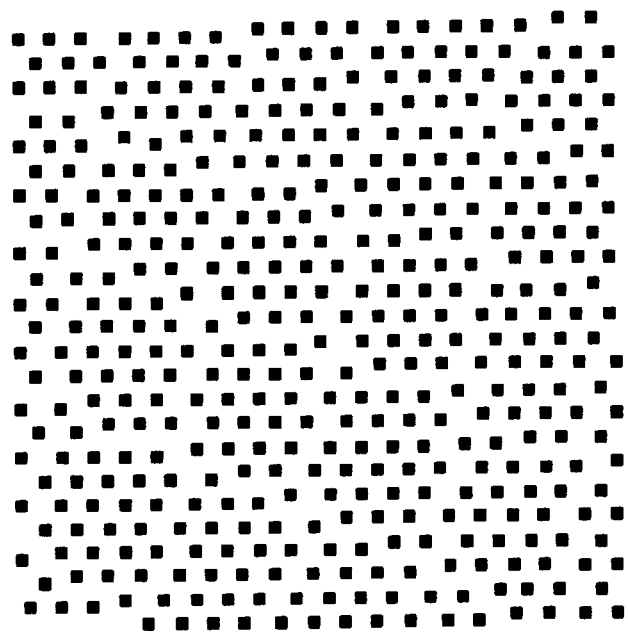
FIG. 14 is a graphical representation of detected peaks for the graphical representation of FIG. 13.
Figure 15:
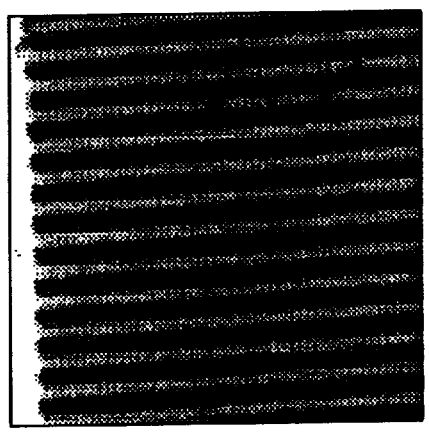
FIG. 15 is a graphical representation of an enlarged view of a ladder chart.
Figure 16:
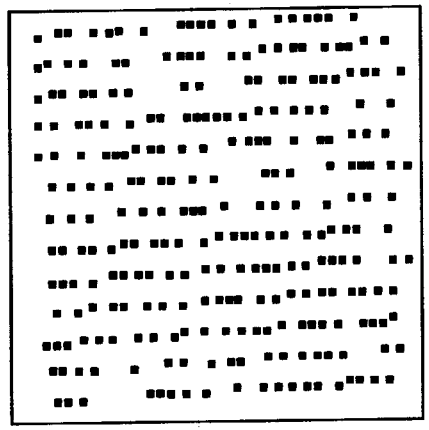
FIG. 16 is a graphical representation of false detection of halftone peaks for the graphical representation of FIG. 15.

To explain the present invention more clearly, the following example will be discussed. As shown in FIG. 13, FIG. 13 illustrates a halftone image which is reproduced at 133 lines per inch and has been magnified. Using the peak detection process described above, the pixels detected as halftone peaks are shown as black dots in FIG. 14. The result of applying the simple halftone peak detection to a ladder chart as shown in FIG. 15, and kanji shown in FIG. 18. The false detection of halftone peaks are obvious from the illustrations of FIGS. 16 and 19 wherein these Figures represent maps of the detected halftone peaks. To suppress these false detections, it is necessary to apply additional criteria to qualify a pixel as a halftone peak.

If the video signal is denoted by $V_{i,j}$ wherein i is the $_I$ scan line and j is the j pixel, the false detections can be suppressed by computing the range of the video in the horizontal, vertical, and diagonal directions across three or five adjacent pixels. For example: for 400 spi $R_{Horizontal}$=Range($V_{i,\ j-1}$, $V_{i,j}$, $V_{i,\ j+1}$) and $R_{Vertical}$=Range($V_{i-1,\ j}$, $V_{i,\ j}$, $V_{i+1,\ j}$); for 600 spi $R_{Horizontal}$=Range($V_{i,\ j-2}$, $V_{i,\ j-1}$, $V_{i,\ j}$, $V_{i,\ j+1}$, $V_{i,\ j+2}$) and $R_{Vertical}$=Range($V_{i-2,\ j}$, $V_{i-1,j}$, $V_{i,\ j}$, $V_{i+1,\ j}$, $V_{i+2,\ j}$); $R_{Diagonal1}$=Range($V_{i-1,\ j+1}$, $V_{i,\ j}$, $V_{i+1,\ j-1}$); and $R_{Diagonal2}$=Range($V_{i+1,\ j-1}$, $V_{i,\ j}$, $V_{i-1,\ j+1}$).

The variations of the video across a few pixels along the direction of a line is expected to be small. If any of these computed video ranges is small at a pixel location, it is likely that a line has passed through the pixel location. These ranges are all expected to be somewhat larger when the center pixel is a real halftone peak. Therefore, the following additional condition is imposed upon the center pixel to be classified as a halftone peak.

Figure 17:
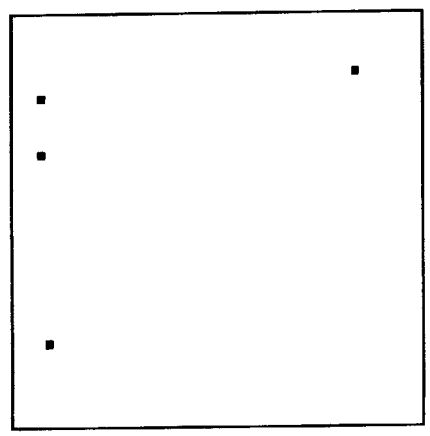
FIG. 17 is a graphical representation of a reduction in the false detection of halftone peaks for the graphical representation of FIG. 15 according to the concepts of the present invention.
Figure 18:
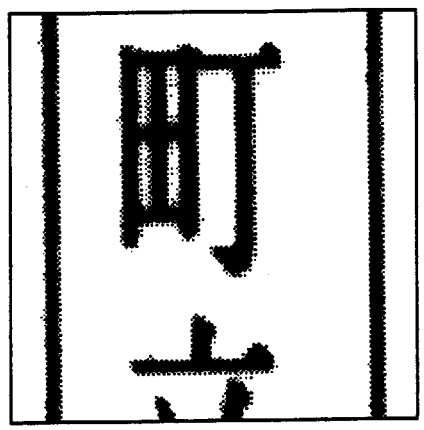
FIG. 18 is a graphical representation of an enlarged view of a kanji area.
Figure 19:
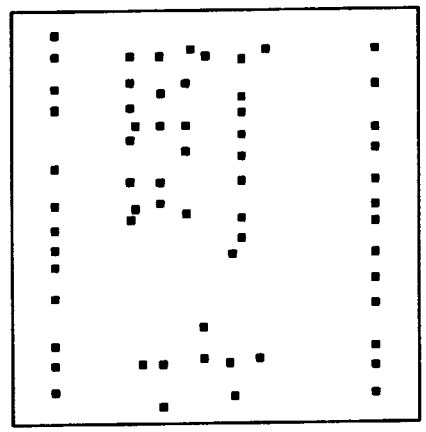
FIG. 19 is a graphical representation of false detection of halftone peaks for the graphical representation of FIG. 18.
Figure 20:
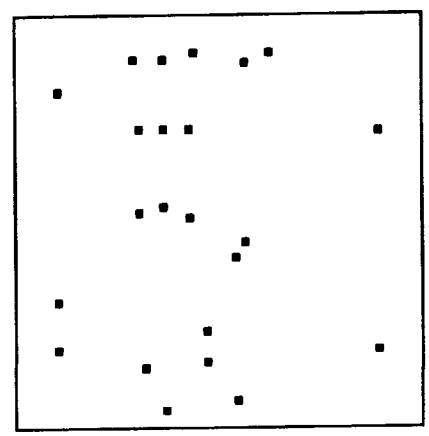
FIG. 20 is a graphical representation of a reduction in the false detection of halftone peaks for the graphical representation of FIG. 18 according to the concepts of the present invention.

$R_{Horizontal}$>S and $R_{Vertial}$>S and $R_{Diagonal1}$>S and $R_{Diagonal2}$>S With this additional constraint, the halftone peak detections for the images shown in FIGS. 15 and 18 are shown in FIGS. 17 and 20, respectively. The false halftone peak detections are significantly reduced. On the other hand, for a real halftone image as illustrated in FIG. 13, the additional constraints put on the center pixel do not reduce the number of halftone peaks detected.

As described above, a compound document can be automatically segmented into areas of different classes. Several of the classifiers (microclassifiers) used in this process depend on the video of neighboring pixels. Since these classifiers (microclassifiers) depend on the video of neighboring pixels, these classifiers (microclassifiers) are very sensitive to the resolution of the actual scanned in document. For example, the common scanning resolutions are 400 spots per inch and 600 spots per inch. If a classifier (microclassifier) is built to correspond to a 400 spot per inch resolution, the classifier (microclassifier) may not provide a correct or optimal output if the image being fed through the classifier is 600 spots per inch.

Therefore, it is desirable that the classifiers (microclassifiers) are implemented such that the classifiers (microclassifiers) are made less sensitive to the actual resolution of the video signal being processed. One embodiment of the present invention realizes this desirability by adjusting the size of the context or number of neighboring pixels which will be utilized by the classifier (microclassifier) in proportion to the scanning resolution of the image. By adjusting the size of the context in proportion to the scanning resolution of the image, the computed classifier (microclassifier) can be made less sensitive to the actual resolution. More specifically, the classifier (microclassifier) of the present invention has the built in flexibility such that the combination of these resolutions in either fastscan or slowscan directions can be readily accommodated by merely adjusting the size of the context in which the classifier (microclassifier) operates upon.

For example, in a halftone peak detection circuit, the halftone area is detected by the presence of enough halftone dots in a window of known size. The halftone dots are identified by the local minimum of the video in the mid-tone to highlight area and the local maximum of the video in the mid-tone to shadow area. If the video signal is denoted by $V_{i,j}$ for the j-th pixel in the i-th scanline, one of the necessary conditions for the local video minimum is as follows:

$V_{i-1,\ j-1} \leq V_{i,j}$ and $V_{i-1,j} < V_{i,j}$ and $V_{i-1,\ j+1} \leq V_{i,j}$ and $V_{i,\ j-1} < V_{i,j}$ and $V_{i,\ j+1} \leq V_{i,j}$ and $V_{i+1,\ j-1} < V_{i,j}$ and $V_{i+1,j} \leq V_{i,j}$ and $V_{i+1,\ j+1} < V_{i,j}$ For a resolution of 400 spots per inch, the checking specified above is adequate. However, if the scanning resolution is increased to 600 spots per inch, the necessary conditions must be extended to include more pixels, namely $V_{i,\ j-2} < V_{i,\ j}$ and $V_{i,\ j+2} \leq V_{i,j}$ for the fastscan direction and $V_{i-2,\ j} < V_{i,j}$ and $V_{i+2,\ j} \leq V_{i,j}$ for the slowscan direction. For the local maximum of the video similar conditions must be also extended wherein the less than and less than and equal are replaced by greater than and greater than or equal, respectively.

Furthermore, in order to reduce the false peak detection in areas of kanji, thin lines and ladder charts, as discussed above, the following conditions are also analyzed wherein S is a small threshold.

Range($V_{i,j-1}$, $V_{i,j}$, $V_{i,j+1}$)>S and Range($V_{i-1,j}$, $V_{i,j}$, $V_{i+1,j}$)>S As noted before, if the image has a resolution of 400 spots per inch, the conditions set forth above are adequate. However, if the image has a resolution of 600 spots per inch, it is also necessary to include more pixels in this condition, namely Range($V_{i,j-2}$, $V_{i,j-1}$, $V_{i,j}$, $V_{i,j+1}$, $V_{i,j+2}$) and Range ($V_{i-2,j}$, $V_{i-1,j}$, $V_{i,j}$, $V_{i+1,j}$, $V_{i+2,j}$) for the higher resolution in the fastscan and slowscan directions, respectively.

As noted above, the number of local video minimums and maximums in a window of known size can be used to estimate the halftone frequency. In actual implementation, a double convolution using a window of uniform weights is applied to 1 bit per pixel bitmap of halftone peaks. This is equivalent to sampling the peak counts with a window of twice the size with a triangular weighting function. The size of the window for the convolution can be 8, 10, 12, 15, or 18 pixels in a fastscan direction and 8, 10, 12, 15 or 18 scanlines in the slowscan direction. Typically, if the scanning resolution of the image is 400 spots per inch, the window size for this implementation is usually 10 pixels in the fastscan direction and 10 scanlines in the slowscan direction. On the other hand, if the image has a resolution of 600 spots per inch, the typical window is 15 pixels in the fastscan direction and 15 scanlines in the slowscan direction. Thus, as noted above, to properly detect the halftone peak counts, the context of the window being analyzed must be adjusted according to the resolution of the incoming image.

To characterize continuous tone verses halftone, text and images, a measure of energy or variation of the video is computed. In this implementation, the Laplacian of the video is first computed as follows:

$$L_{i,j}=(V_{i-1,j-1}+V_{i-1,j}+V_{i-1,j+1}+V_{i,j-1}+V_{i,j+1}+V_{i+1,j-1}+V_{i+1,j}+V_{i+1,j+1})/8-V_{i,j}$$

More specifically, the Laplacian is simply the difference between a pixel and the average of its eight neighbors. After computing the Laplacian, the sum of the absolute values of the Laplacians over a small neighborhood of $N_X$ pixels by $N_Y$ scanlines surrounding the pixel of interest is computed. The parameters $N_X$ is chosen to be 7 for a 400 spot per inch image and 11 for a 600 spot per inch image. The parameters $N_Y$ are chosen to be 3 for a 400 spot per inch image and 5 for a 600 spot per inch image. A pixel is classified as either a smooth contone, rough contone, or edge class depending on its value of the absolute sum. Large absolute Laplacian sums are also a necessary condition for a pixel to be classified as a halftone.

Lastly, it is also desirable to detect line, text, or edges inside a halftone image or tint. Such a detection can be realized by first calculating a local average of the video over a suitable chosen context wherein the local average is computed for each pixel. Next the range of the computed averages over a small neighborhood is checked. If the range exceeds a certain threshold, it is likely that the pixel is an edge pixel. For high frequency halftone tint, the context for averaging the video is three pixels or scanlines for an image at 400 spots per inch revolution and 5 pixels or scanlines for an image at 600 spots per inch resolution in order to effectively smooth out the halftone tint area.

As readily seen above, the various classifiers utilized in an auto-segmentation process requires the context of the window being analyzed to vary from resolution to resolution of the input image. Therefore, the present invention adjusts the context of the window based on the resolution of the input image. In other words, the implementation of the automatic image segmentation process has the built in flexibility to effectively analyze the image at any input resolution wherein this is accomplished by varying the context required for the classifiers (microclassifiers) that the determine the segmentation in proportion to the input resolution.

Figure 12:
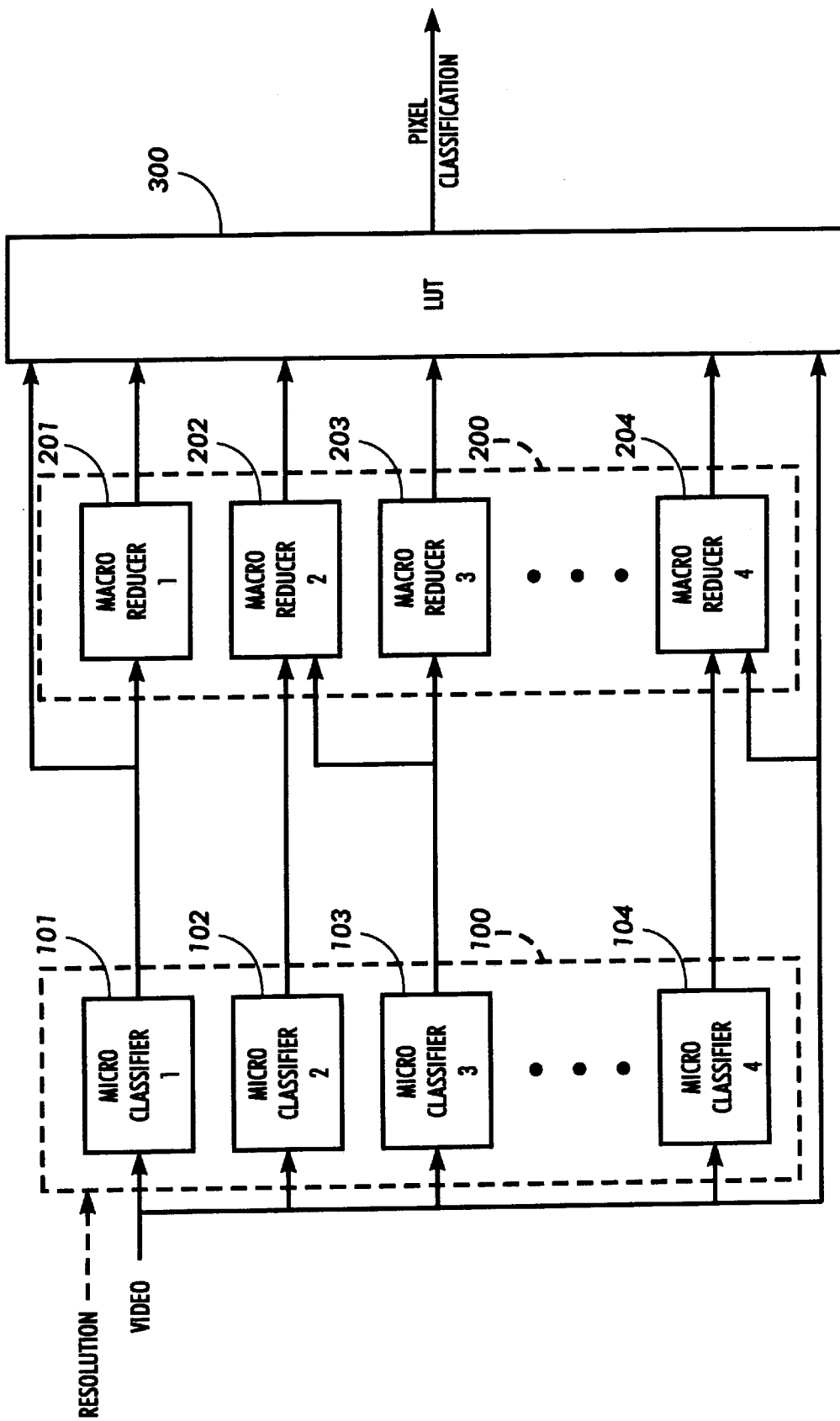
FIG. 12 is a block diagram illustrating a third scalable image classification system architecture according to the concepts of the present invention.

An example of such a system is illustrated in FIG. 12. As illustrated in FIG. 12, the video signal or image data is fed into a microclassifier system 100, a macro-reduction system 200, and a pixel classification look-up table 300. The microclassifier system 100 is made of a plurality of microclassifier circuits 101–104. These microclassifier circuits measure intrinsic properties of the video extracted through a simple mathematical formula or heuristic. The microclassification values are fed into the macro-reduction system 200. The microclassifier system 100 also receives the resolution of the incoming video signal. This information is used by the microclassifier circuits to conform their calculations and measurements to the actual resolution of the video signal.

The macro-reduction system 200 is made of a plurality of macro-reduction circuits 201–204. Each macro-reduction circuit reduces microclassification values received from the microclassifiers to produce higher level, more directly useful information through mathematical operations and heuristics, suppressing noise and other irrelevant or undesirable variations in the microclassifiers. The macro-reduced values are fed into the pixel classification look-up table 300. To the extent to which the expected microclassifier values are impacted by the resolution driven adjustment of their calculation, the macro-reduction parameters must be adjusted by either a control processor or adapted accordingly by the system.

The pixel classification look-up table 300 is a programmable look-up table reduces the macro-reduced outputs to the final classification in a very fast manner. The look-up table 300 also enables any arbitrarily complex function to be performed, since the arbitrarily complex function can be pre-calculated off-line and loaded into the table. Microclassification values or even the input video may also be used directly by the programmable table 300 if appropriate.

Although the present invention has been described in detail above, various modifications can be implemented without departing from the spirit of the present invention. For example, the preferred embodiment of the present invention has been described with respect to a xerographic printing system; however, these fuzzy methods and filters are readily implemented in a thermal inkjet system, a display system, or other image processing system.

Moreover, the image processing system of the present invention can be readily implemented on a general purpose computer, a personal computer or workstation. The image processing system of the present invention can be readily implemented on an ASIC, thereby enabling the placement of this process in a scanner, electronic subsystem, printer, or display device.

The present invention has been described with respect to a video range of 0 to 255. However, it is contemplated by the present invention that the video range can be any suitable range to describe the grey level of the pixel being processed. Furthermore, the present invention is readily applicable to any image processing system, not necessarily a binary output device. It is contemplated that the concepts of the present invention are readily applicable to a four-level output terminal or higher.

Also, the present invention has been described, with respect to the fuzzy classification and fuzzy processing routines, that the scalar values are determined using the weighted sum of the centriod method since the centriods in the preferred embodiment are non-overlapping (the classes are non-overlapping). However, the present invention is readily applicable to a system with overlapping classes. Such an extension is readily known to those skilled in the art of fuzzy logic.

Lastly, the present invention has been described with respect to a monochrome or black/white environment. However, the concepts of the present invention are readily applicable to a color environment. Namely, the processing operations of the present invention can be applied to each color space value, some function of a given pixel's color space components, or even a function of the color space components of a pixel and other pixels in the neighborhood.

While the invention has been described with reference to various embodiments disclosed above, it is not confined to the details set forth above, but is intended to cover such modifications or changes as may come within the scope of the attached claims.

What is claimed is:

1. A method for reducing false halftone detection in image areas having thin lines, comprising the steps of:

(a) determining a horizontal video range value for a pixel in a video stream;

(b) determining a vertical video range value for a pixel in a video stream;

(c) determining a first diagonal video range value for a pixel in a video stream;

(d) determining a second diagonal video range value for a pixel in a video stream;

(e) determining if at least one value from the group of values consisting of horizontal video range value, vertical video range value, first diagonal video range value, and second diagonal video range value is greater than a predetermined threshold value; and (f) classifying the pixel as a halftone peak value when said step (e) makes a positive determination.

2. The method as claimed in claim 1, wherein said step (a) determines the horizontal video range value for the pixel dependent upon a resolution of the video stream.

3. The method as claimed in claim 1, wherein said step (b) determines the vertical video range value for the pixel dependent upon a resolution of the video stream.

* * * * *